United States Patent

Koyama et al.

Patent Number: 5,264,773
Date of Patent: Nov. 23, 1993

[54] CONTROLLER FOR INDUCTION MOTOR

[75] Inventors: Masato Koyama, Amagasaki; Akira Imanaka; Masahiko Iwasaki, both of Nagoya, all of Japan

[73] Assignee: Mitsubishi Denki K.K., Tokyo, Japan

[21] Appl. No.: 839,427

[22] Filed: Feb. 21, 1992

[30] Foreign Application Priority Data

Feb. 22, 1991 [JP] Japan .................... 3-028126
Jul. 22, 1991 [JP] Japan .................... 3-180816

[51] Int. Cl.$^5$ ............................ H02D 5/40
[52] U.S. Cl. ............................ 318/798; 318/807
[58] Field of Search ........... 388/811, 819; 318/811, 318/539, 807, 798, 808, 809, 810, 803

[56] References Cited

U.S. PATENT DOCUMENTS

| | | | |
|---|---|---|---|
| 3,908,130 | 9/1975 | Lafuze | 318/808 |
| 4,310,791 | 1/1982 | Akamatsu | 318/809 |
| 4,484,128 | 11/1984 | Jötten et al. | 318/803 |
| 4,680,526 | 7/1987 | Okuyama et al. | 318/808 |

Primary Examiner—William M. Shoop, Jr.
Assistant Examiner—John W. Cabeca
Attorney, Agent, or Firm—Sughrue, Mion, Zinn, Macpeak & Seas

[57] ABSTRACT

An error current component which becomes zero when an actual value of a primary flux coincides with a set value inducted by a product of an exciting current command and a primary self-inductance by detecting a primary current of an inductance motor, is inducted by an error current component processing circuit. A primary resistance compensation circuit processes a compensation amount of a primary resistance compensation amount. And a compensation voltage processing circuit processes a compensation voltage which directs the error current component to zero. A rotating speed of the induction motor can be controlled in a stable state even though a value of primary resistance of the induction motor is varied by temperature. Further, inadequate torque and excess current can be avoided.

9 Claims, 18 Drawing Sheets

CONTROLLER FOR INDUCTION MOTOR

FIELD OF THE INVENTION

This invention generally relates to a controller, and more particularly to a controller for an induction motor which controls a primary frequency in an induction motor and to a controller which limits or controls generated torque in an induction motor.

BACKGROUND OF THE INVENTION

A structure of a conventional controller for an induction motor is shown in FIG. 1, wherein numeral 1 denotes an induction motor, numeral 21 denotes a transistor inverter circuit for driving the induction motor 1 by a variable frequency, numeral 22 denotes a frequency command generator, numeral 23 denotes a function generator, numeral 24 denotes a primary voltage command generating circuit, and numeral 25 denotes a PWM circuit.

The theory of the frequency control by the controller in the induction motor will be described as follows. Equivalent T circuit in one phase in the conventional controller for an induction motor is shown in FIG. 2, wherein $R_1$ denotes a primary resistance, $R_2$ denotes a secondary resistance, $l_1$ denotes a primary leakage inductance, $l_2$ denotes a secondary leakage inductance, M denotes a primary/secondary mutual inductance, $\omega_l$ denotes a primary frequency, $\omega_s$ denotes a slide frequency, $V_1$ denotes a primary voltage, $E_0$ denotes a clearance induced voltage, $I_1$ denotes a primary electric current, and $I_2$ denotes a secondary electric current.

Clearance magnetic flux $\Phi_0$ is fixed from the induced voltage $E_0$ and the primary frequency $\omega_1$. Time integral of voltage is magnetic flux. Accordingly, an expression (1) is established.

$$\Phi_0 = E_0/\omega_1 \tag{1}$$

Electric current $I_{2r}$ which generates torque, acting on the magnetic flux $\Phi_0$, is the same phase component as an effective part of the secondary electric current $I_2$, i.e., the induced voltage $E_0$. Accordingly, $I_{2r}$ is fixed by an expression (2) as shown in FIG. 2.

$$I_{2r} = \frac{R_2 E_0}{R_2^2 + \omega_g^2 l_2^2} \cdot \frac{\omega_g}{\omega_1} \tag{2}$$

Generated torque $T_e$ in the induction motor is proportional to the product of the magnetic flux $\Phi_0$ and the electric current $I_{2r}$. Accordingly, an expression (3) is established.

$$T_e = K \Phi_0 I_{2r} \tag{3}$$

K: Propotional Constant

The expressions (1) and (2) are put in the expression (3), which establishes an expression (4).

$$T_o = K \left( \frac{E_0}{\omega_1} \right)^2 \frac{\omega_g R_2}{R_2^2 + \omega_g^2 l_2^2} \tag{4}$$

In the expression (4), when $E_0/\omega_1$ is controlled to be fixed, the generated torque $T_e$ varies, depending upon the slide frequency $\omega_s$. The maximum torque $T_{max}$ is obtained by integrating the expression (4) by the slide frequency $\omega_s$ and making its numerator 0, which establishes an expression (5).

$$T_{max} = K \left( \frac{E_0}{\omega_1} \right)^2 \frac{1}{2 l_2} \tag{5}$$

Accordingly, the maximum torque $T_{max}$ has no relationship with variation of $\omega_1$, when $E_0/\omega_1$ is fixed.

Since the induced voltage $E_0$ can not be easily detected in fact, it is typical that V/F constant controlling system is used, in which the primary voltage $V_1$ is proportional to $\omega_1$ and the value of $V_1/\omega_1$ is controlled to be fixed.

In this case, in the area where the primary frequency $\omega_1$ is low, potential drop by the primary resistance $R_1$ occurs on the primary voltage $V_1$. Accordingly, $V_1$ is previously amplified corresponding to $R_1$ and $I_1$ in the low voltage area.

An operation of the controller shown in FIG. 1 will be described as follows. The function generator 23 inputs a primary frequency command $\omega_1^*$ outputted from the frequency command generator 22 in accordance with the function relationship shown by the real line in FIG. 3, and outputs an amplitude command $V_1^*$ of the primary voltage.

The primary voltage command generating circuit 24 outputs primary voltage commands $V_{1u}^*$, $V_{1v}^*$, and $V_{1w}^*$ to be impressed on each primary coil winding of the induction motor 1, after an expression (6) is operated in accordance with the amplitude command $V_1^*$ of the primary voltage and the primary frequency command $\omega_1^*$.

$$\left. \begin{array}{l} V_{1u}^* = V_1 * \cos \omega_1 * t \\ V_{1v}^* = V_1 * \cos(\omega_1 * t - 2\pi/3) \\ V_{1w}^* = V_1 * \cos(\omega_1 * t + 2\pi/3) \end{array} \right\} \tag{6}$$

The PWM circuit 25 generates a base signal which controls an ON/OFF action of a transistor (not shown in the drawings) comprising the transistor inverter circuit 21 corresponding to the primary voltage commands $V_{1u}^*$, $V_{1v}^*$, and $V_{1w}^*$. As a result, the primary voltages $V_{1u}$, $V_{1v}$, and $V_{1w}$ actually impressed on the induction motor 1 are controlled to comply with each command. Accordingly, it is possible to control a frequency of the induction motor 1, i.e., a rotary speed, corresponding to the primary frequency command $\omega_1^*$.

In the conventional controller for an induction motor constructed as above, when a large amount of the generated torque is necessary in a low speed revolution, the primary voltage command $V_1^*$ must be previously set to a high value to compensate for a voltage dropped by the primary resistance $R_1$, as shown in FIG. 3.

However, it is difficult to compensate precisely for the dropped voltage, since a value of the primary resistance $R_1$ is fluctuated by temperature. Accordingly, when the voltage compensated is smaller than the voltage actually dropped, on the assumption that a load torque is steadily impressed on the induction motor, the induction motor can not be started because of a lack of the generated torque in a low speed revolution. In contrast, when the voltage compensated is larger than the voltage actually dropped, an operation of the inverter circuit must be stopped to protect the inverter circuit from an excess current by the large amount of the primary current in a low speed revolution. When a machine operated by the induction motor is different, the amount of the generated torque being the same, a total moment of inertia is different. Accordingly, a variation rate in a rotary speed of the induction motor is different. Accordingly, unless the variation rate of the primary frequency command $\omega_1^*$ is properly adjusted, the induction motor speed is not adjusted in accordance with $\omega_1^*$, and the operation of the inverter circuit must be stopped to protect the inverter circuit from the excess current by the large amount of primary current.

When a sudden impact load is impressed, the operation of the inverter circuit must be stopped to protect the inverter circuit from the excess current by the large amount of primary current because of a lack of a limiting function for the torque in the conventional controller for an induction motor.

In the conventional controller for an induction motor, the primary voltage previously set according to the value of the primary frequency command is outputted as above, and there is no function for controlling the torque generated in the induction motor. Accordingly, the torque control is impossible in principle.

SUMMARY OF THE INVENTION

Accordingly, it is an object of the invention to provide a controller for an induction motor by which there is no decrease in desired torque or excess current, even though the value of the primary resistance $R_1$ of the induction motor is changed by the temperature, and by which a rotary speed of the induction motor can be controlled to be stable all the time, not depending upon the variation rate of the primary frequency command $\omega_1^*$ driven by the induction motor.

It is another object of the invention to provide an induction motor controller by which the generated torque in the induction motor is controlled not to be over a limit value and an excess current is prevented.

It is further an object of the invention to provide a controller for an induction motor by which the generated torque in the induction motor can be controlled to comply with a command.

To attain the above and other objects, according to the first embodiment of the invention, a controller for an induction motor comprises:
an induction motor,
a current detecting means for detecting a primary current of the induction motor,
a variable-frequency power converting means for driving the induction motor by a variable-frequency,
a no-load voltage processing means for outputting a no-load voltage command value of the induction motor by inputting a primary frequency command value and an exciting current command value,
an error current component processing means for processing an error current component which becomes zero when an actual value of a primary flux occurring inside the induction motor, by inputting the primary current, the primary frequency command value, and the exciting current command value, coincides with a set value of the primary flux obtained from a product of the exciting current command value and a primary self-inductance of the induction motor,
a compensation voltage processing means for processing a compensation voltage to direct the error current component value to zero by inputting the primary frequency command value and the output from the error current component processing means, and
a primary voltage command processing means for processing a primary voltage command value of the induction motor by inputting the primary frequency command value, the no-load voltage command value, and the compensation voltage, and for outputting the primary voltage command value to the variable-frequency power converting means.

In the first embodiment of the invention, a no-load voltage of the induction motor is outputted from a no-load voltage processing circuit. An error current component, which becomes zero when an actual value of a primary flux occurring inside the induction motor coincides with a command value of the primary flux obtained from a product of the exciting current command value and a primary self-inductance of the induction motor, is outputted from an error current component processing circuit. A compensation voltage to direct the error current component to zero is outputted from a compensation voltage processing circuit. A primary voltage command value of the induction motor is outputted from a primary voltage command processing circuit. An actual value of the primary voltage impressed on the induction motor is controlled to comply with the primary voltage command value by a variable-frequency power converting circuit.

According to the second embodiment of the invention, a controller of an induction motor comprises:
an induction motor,
a current detecting means for detecting a primary current of the induction motor,
a variable-frequency power converting means for driving the induction motor by a variable-frequency,
a no-load voltage processing means for outputting a no-load voltage command value of the induction motor by inputting the primary frequency command value and an exciting current command value,
an error current component processing means for processing an error current component which becomes zero when an actual value of a primary flux occurring inside the induction motor, by inputting the primary current, the primary frequency command value, and the exciting current command value, coincides with a set value of the primary flux obtained from a product of the exciting current command value and a primary self-inductance of the induction motor,
primary resistance compensating means for processing a compensation quantity of a primary resistance set value by inputting the output from the error current component processing means,
a compensation voltage processing means for processing a compensation voltage to direct the error current component value to zero by inputting the primary frequency command value, the output from the error current component processing means, and the output from the primary resistance compensating means, and
a primary voltage command processing means for processing a primary voltage command value of the induction motor by inputting the primary frequency command value, the no-load voltage command value, and the compensation voltage, and for outputting the primary voltage command value to the variable-frequency power converting means.

In the second embodiment of the invention, a no-load voltage of the induction motor is outputted from a no-load voltage processing circuit. An error current component, which becomes zero when an actual value of a primary flux occurring inside the induction motor coincides with a command value of the primary flux obtained from a product of the exciting current command value and a primary self-inductance of the induction motor, is outputted from an error current component processing circuit. A compensation quantity $\Delta R_1^*$ of a primary resistance set value $R_1^*$ is processed from the error current component and is outputted by a primary resistance compensating circuit. A compensation voltage to direct the error current component value to zero is outputted, using the compensation quantity of the primary resistance set value, by a compensation voltage processing circuit. A primary voltage command value of the induction motor is outputted by a processing in a primary voltage command processing circuit. An actual value of the primary voltage impressed on the induction motor is controlled to comply with the primary voltage command value by a variable-frequency power converting circuit.

According to the third embodiment of the invention, a controller for an induction motor comprises:

an induction motor, a current detecting means for detecting a primary current of the induction motor, a variable-frequency power converting means for driving the induction motor by a variable-frequency, a no-load voltage processing means for outputting a no-load voltage command value of the induction motor by inputting a primary frequency command value, a primary frequency compensation value, and an exciting current command value, an error current component processing means for processing an error current component which becomes zero when an orthogonal component on a rotating co-ordinate axis rotated by the primary frequency of the primary current and an actual value of a primary flux occurring inside the induction motor, by inputting the sum of the primary frequency command value and the frequency compensation value, the primary current, and the exciting current command value, coincide with a set value of a primary flux obtained from a product of the exciting current command value and a primary self-inductance in the induction motor, a compensation voltage processing means for processing a compensation voltage to direct the error current component value to zero by inputting the sum of the primary frequency command value and the primary frequency compensation value, and the output from the error current component processing means, a primary voltage command processing means for processing a primary voltage command value in the induction motor, by inputting the sum of the primary frequency command value and the primary frequency compensation value, and the no-load voltage command value and the compensation voltage, and for outputting the primary voltage command value to the variable-frequency power converting means, and a torque limiting means for processing the primary frequency compensation value for the generated torque in the induction motor not to be over a limit value by inputting the output from the error current component processing means.

In the third embodiment of the invention, a no-load voltage of the induction motor is outputted from a no-load voltage processing circuit. An error current component, which becomes zero when an orthogonal component on a rotating co-ordinate axis rotated by the primary frequency of the primary current of the induction motor and an actual value of the primary flux occurring inside the induction motor coincide with a set value of a primary flux obtained from a product of the exciting current command value and a primary self-inductance in the induction motor, is outputted by an error current component processing circuit. A primary frequency compensation value is outputted so that the generated torque in the induction motor will not be over a limit value as set by a torque limiting circuit. A voltage to direct the error current component value to zero is outputted by a compensation voltage processing circuit. A primary voltage command value of the induction motor is outputted by a primary voltage command processing circuit. An actual value of the primary voltage to be impressed on the induction motor is controlled to comply with the primary voltage command value by a variable-frequency power converting circuit. The primary frequency compensation value outputted from the torque limiting circuit is added to a primary frequency command value, which is inputted to the no-load voltage processing circuit, the error current component circuit, the compensation voltage processing circuit, and the primary voltage command processing circuit, as a compensation primary frequency command value.

According to the fourth embodiment of the invention, a controller for an induction motor comprises:

an induction motor, a current detecting means for detecting a primary current of the induction motor, a variable-frequency power converting means for driving the induction motor by a variable-frequency, a no-load voltage processing means for outputting a no-load voltage command value of the induction motor by inputting a primary frequency command value and an exciting current command value, an error current component processing means for processing an error current component which becomes zero when an orthogonal component on a rotating co-ordinate axis rotated by the primary frequency of the primary current and an actual value of a primary flux occurring inside the induction motor, by inputting the primary frequency command value, the primary current, and the exciting current command value, coincide with a set value of a primary flux obtained from a product of the exciting current command value and a primary self-inductance in the induction motor, a compensation voltage processing means for processing a compensation voltage to direct the error current component value to zero by inputting the primary frequency command value and the output from the error current component processing means, a primary voltage command processing means for processing a primary voltage command value of the induction motor by inputting the primary frequency command value, the no-load voltage command value, and the compensation voltage, and for outputting the primary voltage command value to the variable-frequency power converting means, and a torque controlling means for processing the primary frequency command value for the generated torque in the induction motor to comply with the command value by inputting the output from the error current component processing means.

In this embodiment of the invention, a no-load voltage processing circuit, an error current component processing circuit, a compensation voltage processing circuit, a primary voltage command processing circuit, and a variable-frequency power converting circuit respectively carry out the same operations as those in the second embodiment of the invention. In a torque controlling circuit, the output from the error current component processing circuit is inputted, and a primary frequency command value is outputted for the generated torque in the induction motor to comply with the command value. The primary frequency command value outputted from the torque control circuit is inputted to the no-load voltage processing circuit, the error current component processing circuit, the compensation voltage processing circuit, and the primary voltage command processing circuit.

Other objects and features of this invention will become understood from the following description with reference to the accompanying drawings.

BRIEF DESCRIPTION OF THE DRAWINGS

The invention will be described in more detail in conjunction with following drawings, wherein.

DESCRIPTION OF THE PREFERRED EMBODIMENT

A first embodiment of the invention will be described in accordance with the drawings.

Figure 1:
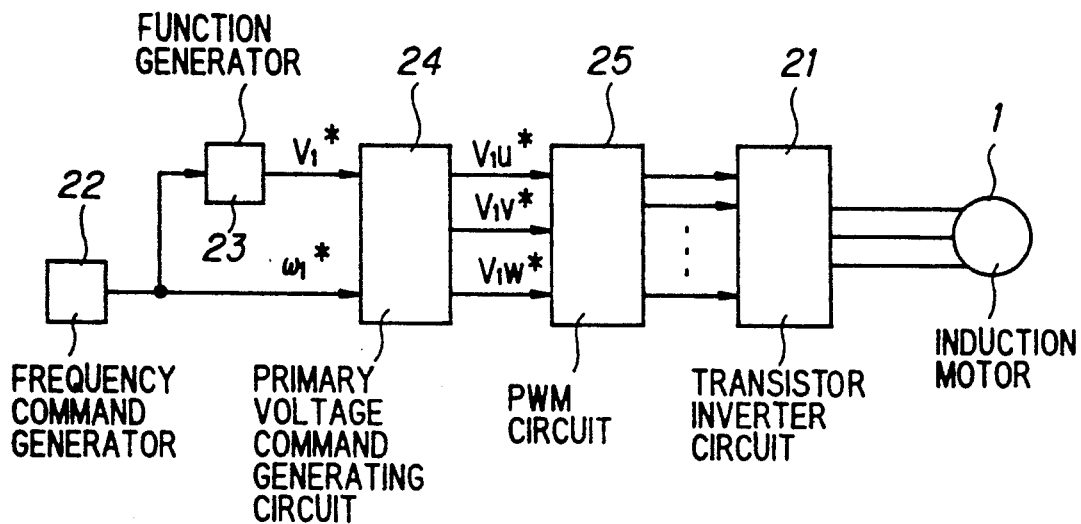
FIG. 1 is a block diagram showing an example of a structure of a conventional controller for an induction motor.
Figure 2:
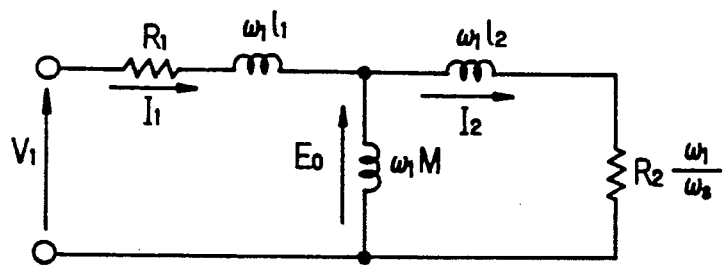
FIG. 2 is a circuit diagram showing an equivalent T circuit in one phase in the conventional controller for an induction motor.
Figure 3:
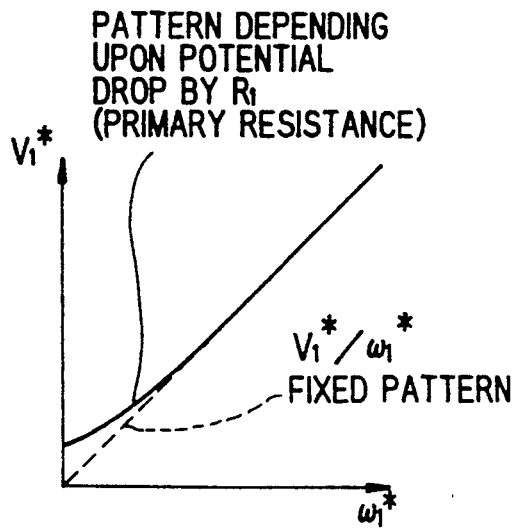
FIG. 3 is a pattern diagram showing a function generator in the conventional controller for an induction motor.
Figure 4:
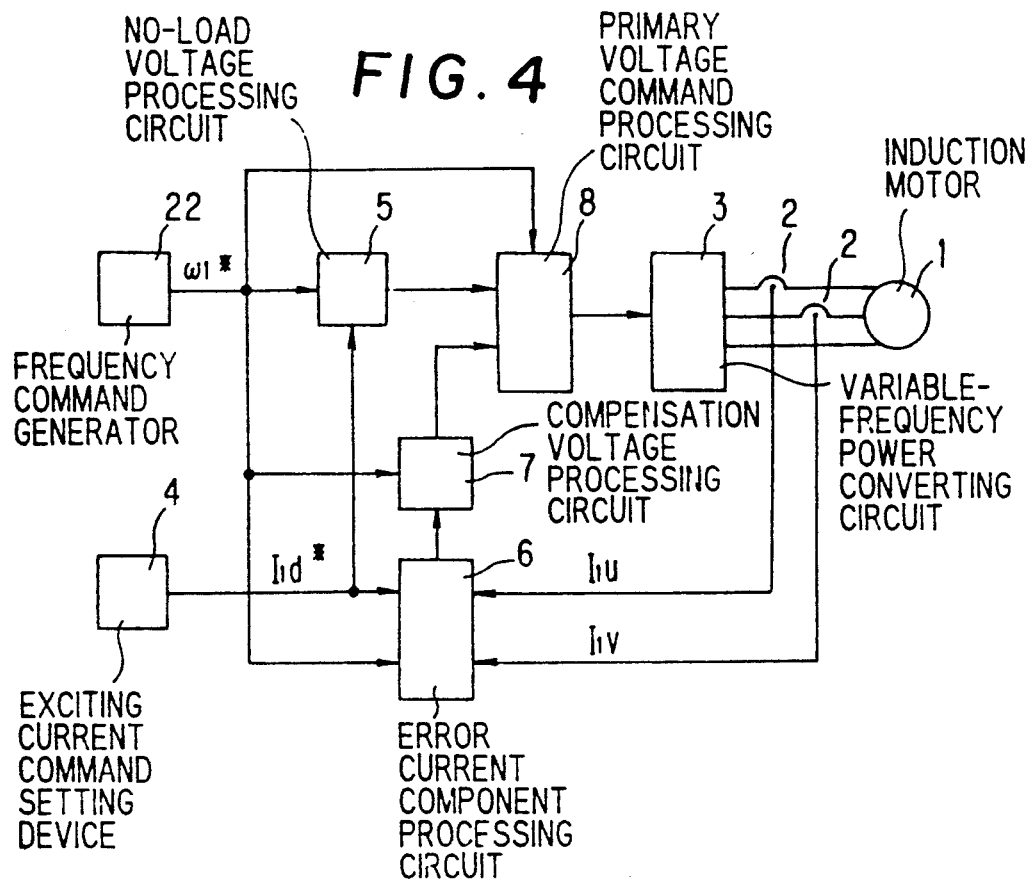
FIG. 4 is a block diagram showing a structure of a first embodiment of a controller for an induction motor in the present invention.

FIG. 4 is a block diagram showing a whole structure of a first embodiment of this invention, wherein numeral 1 and 22 respectively denote an induction motor and a frequency command generator which are the same as those in the conventional controller for an induction motor shown in FIG. 1. Numeral 2 denotes a current detector for detecting a primary current in the induction motor 1. Numeral 3 denotes a variable-frequency power converting circuit, which comprises a transistor inverter circuit 21 and a PWM circuitry 25, for example, as in the conventional controller. Numeral 4 denotes an exciting current command setting device. Numeral 5 denotes a no-load voltage processing circuit, connected to the exciting current command setting device 4 and the frequency command generator 22, for outputting a no-load voltage command. Numeral 6 denotes an error current component processing circuit, connected to the current detector 2, the exciting current command setting device 4, and the frequency command generator 22, for processing an error current component in accordance with the exciting current command value and the primary current in the induction motor 1. Numeral 7 denotes a compensation voltage processing circuit, connected to the error current component processing circuit 6 and the frequency command generator 22, for processing a compensation voltage. Numeral 8 denotes a primary voltage command processing circuit, connected to the compensation voltage processing circuit 7, the no-load voltage processing circuit 6, and the frequency command generator 22, for outputting a primary voltage command in accordance with the no-load voltage command and the compensation voltage.

Figure 5:
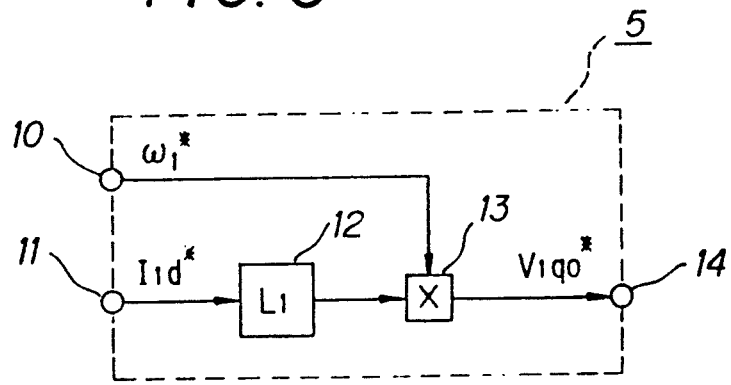
FIG. 5 is a block diagram showing an example of a structure of a no-load voltage processing circuit shown in FIG. 4.

FIG. 5 is a block diagram showing in detail the structure of the no-load voltage processing circuit 5, wherein the no-load voltage processing circuit 5 comprises:
- an input terminal 10 connected to the frequency command generator 22,
- an input terminal 11 connected to the exciting current command setting device 4,
- a coefficient device 12 connected to the input terminal 11,
- a multiplier 13 connected to the input terminal 10 and the coefficient device 12, and
- an output terminal 14 connected to the multiplier 13.

Figure 6:
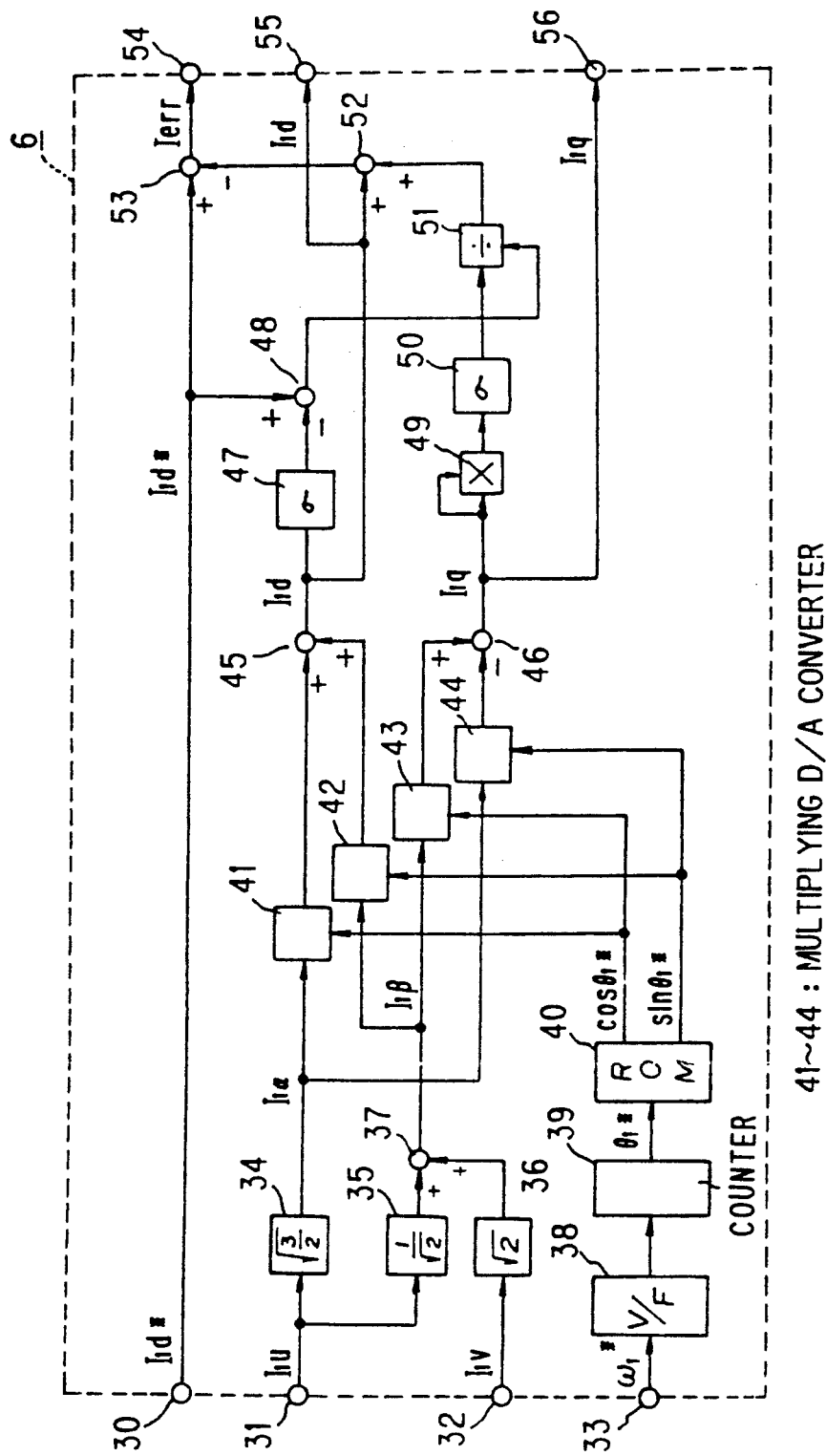
FIG. 6 is a block diagram showing an example of a structure of an error current component processing circuit shown in FIG. 4.

FIG. 6 is a block diagram showing in detail the structure of the error current component processing circuit 6, wherein the error current component processing circuit 6 comprises:
- an input terminal 30 connected to the exciting current command setting device 4,
- input terminals 31 and 32 connected to the current detector 2,
- an input terminal 33 connected to the frequency command generator 22,
- coefficient devices 34, 35, 36, 47, and 50,
- adders 37, 45, and 52,
- a V/F converter 38,
- a counter 39,
- a ROM 40,
- multiplying D/A converters 41–44,
- subtracters 46, 48, and 53,
- a multiplier 49,
- a divider 51, and
- output terminals 54–56.

Figure 7:
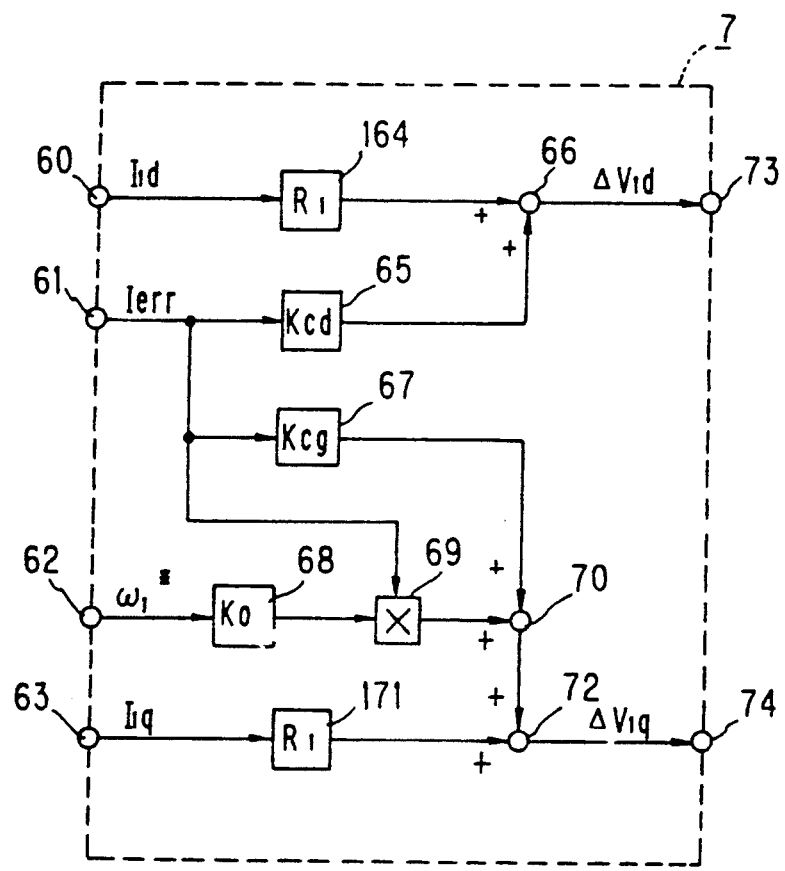
FIG. 7 is a block diagram showing an example of a structure of a compensation voltage processing circuit shown in FIG. 4.

FIG. 7 is a block diagram showing in detail the structure of the compensation voltage processing circuit 7, wherein the compensation voltage processing circuit 7 comprises:
- input terminals 60, 61, and 63 connected to the error current component processing circuit 6,
- an input terminal 62 connected to the frequency command generator 22,
- coefficient devices 164, 68, and 171,
- amplifiers 65 and 67,
- adders 66, 70, and 72,
- a multiplier 69, and
- output terminals 73 and 74.

Figure 8:
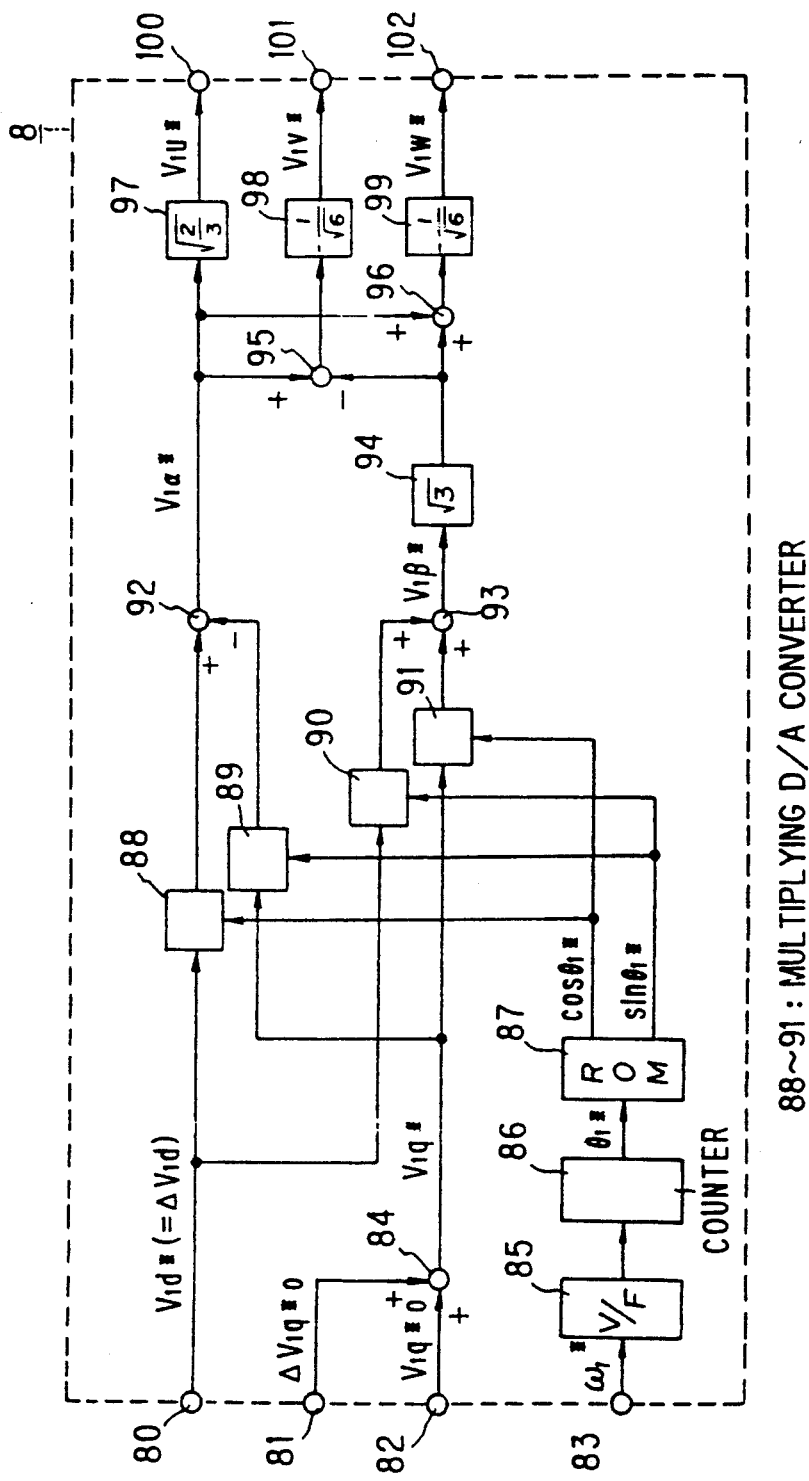
FIG. 8 is a block diagram showing an example of a structure of a primary voltage command processing circuit shown in FIG. 4.

FIG. 8 is a block diagram showing in detail the structure of the primary voltage command processing circuit 8, wherein the primary voltage command processing circuit 8 comprises:
- input terminals 80 and 81 connected to the compensation voltage processing circuit 7,
- an input terminal 82 connected to the no-load voltage processing circuit 5,
- an input terminal 83 connected to the frequency command generator 22,
- adders 84, 93, and 96,
- a V/F converter 85,
- a counter 86,
- a ROM 87,
- multiplying D/A converters 88–91,
- subtracters 92 and 95,
- coefficient devices 94, 97–99, and
- output terminals 100–102.

A control system of the induction motor in this invention will be described as follows. It is common that the primary voltage $V_{1u}$, $V_{1v}$, and $V_{1w}$ impressed on the induction motor 1 can be transformed by an expression (7) to components $V_{1\alpha}$, $V_{1\beta}$ on a Cartesian coordinate axis ($\alpha$-$\beta$ coordinate axis).

$$V_{1\alpha} = \sqrt{\frac{3}{2}}\, V_{1u} \\ V_{1\beta} = \frac{1}{\sqrt{2}}\, V_{1u} + \sqrt{2}\, V_{1v} \tag{7}$$

$V_{1\alpha}$: $\alpha$ axis component of primary voltage
$V_{1\beta}$: $\beta$ axis component of primary voltage On the contrary, $V_{1\alpha}$ and $V_{1\beta}$ can be transformed from the expression (7) to $V_{1u}$, $V_{1v}$, and $V_{1w}$ by an expression (8).

$$V_{1u} = \sqrt{\frac{2}{3}}\, V_{1\alpha} \\ V_{1v} = -\frac{1}{\sqrt{6}}(V_{1\alpha} - \sqrt{3}\, V_{1\beta}) \\ V_{1w} = -\frac{1}{\sqrt{6}}(V_{1\alpha} + \sqrt{3}\, V_{1\beta}) \tag{8}$$

A relational expression between primary current $I_{1u}$, $I_{1v}$, and $I_{1w}$, and an $\alpha$-axis component $I_{1\alpha}$ and a $\beta$-axis component $I_{1\beta}$, is shown by expressions (9) and (10) respectively.

$$I_{1\alpha} = \sqrt{\frac{3}{2}}\, I_{1u} \\ I_{1\beta} = \frac{1}{\sqrt{2}}\, I_{1u} + \sqrt{2}\, I_{1v} \tag{9}$$

$$I_{1u} = \sqrt{\frac{2}{3}}\, I_{1\alpha} \\ I_{1v} = -\frac{1}{\sqrt{6}}(I_{1\alpha} - \sqrt{3}\, I_{1\beta}) \\ I_{1w} = -\frac{1}{\sqrt{6}}(I_{1\alpha} + \sqrt{3}\, I_{1\beta}) \tag{10}$$

A voltage/current equation of the induction motor in the $\alpha$-$\beta$ coordinate axis is commonly shown by an expression (11).

$$V_{1\alpha} = (R_1 + PL_1)I_{1\alpha} + PMI_{2\alpha} \\ V_{1\beta} = (R_1 + PL_1)I_{1\beta} + PMI_{2\beta} \\ 0 = PMI_{1\alpha} + \omega_m MI_{1\beta} + (R_2 + PL_2)I_{2\alpha} + \omega_m L_2 I_{2\beta} \\ 0 = -\omega_m MI_{1\alpha} + PMI_{1\beta} - \omega_m L_2 I_{2\alpha} + (R_2 + PL_2)I_{2\beta} \tag{11}$$

$L_1$, $L_2$: primary/secondary self-inductance of each induction motor,
$I_{2\alpha}$, $I_{2\beta}$: $\alpha$ axis component of each secondary current,
$\omega_m$: rotating speed
P: differential operator ($=d/dt$)

Coordinate rotation expressions shown by expressions (12)–(14) are used to transform the expression (11) to a relational expression on a rotating coordinate axis (d - q coordinate axis) rotated by the primary frequency $\omega_1$.

$$\left.\begin{array}{l} V_1\alpha = V_{1d}\cos\theta_1 - V_{1q}\sin\theta_1 \\ V_1\beta = V_{1d}\sin\theta_1 + V_{1q}\cos\theta_1 \end{array}\right\} \quad (12)$$

$$\left.\begin{array}{l} I_1\alpha = I_{1d}\cos\theta_1 - I_{1q}\sin\theta_1 \\ I_1\beta = I_{1d}\sin\theta_1 + I_{1q}\cos\theta_1 \end{array}\right\} \quad (13)$$

$$\left.\begin{array}{l} I_2\alpha = I_{2d}\cos\theta_1 - I_{2q}\sin\theta_1 \\ I_2\beta = I_{2d}\sin\theta_1 + I_{2q}\cos\theta_1 \end{array}\right\} \quad (14)$$

A coordinate rotation angle $\theta_1$ is inducted or adduced by an expression (15).

$$\theta_1 = \int \omega_1 dt \quad (15)$$

An expression (16) is inducted by eliminating $V_1\alpha$, $V_1\beta$, $I_1\alpha$, $I_1\beta$, $I_2\alpha$, and $I_2\beta$, after substituting the expressions (12)–(14) for the expression (11).

$$\left.\begin{array}{l} V_{1d} = (R_1 + PL_1)I_{1d} - L_1\omega_1 I_{1q} + PMI_{2d} - M\omega_1 I_{2q} \\ V_{1q} = L_1\omega_1 I_{1d} + (R_1 + PL_1)I_{1q} + M\omega_1 I_{2d} + PMI_{2q} \\ 0 = PMI_{1d} - M\omega_g I_{1q} + (R_2 + PL_2)I_{2d} - L_2\omega_g I_{2q} \\ 0 = M\omega_g I_{1d} + pMI_{1q} + L_2\omega_g I_{2d} + (R_2 + PL_2)I_{2q} \end{array}\right\} \quad (16)$$

A slip frequency $\omega_s$ is inducted by an expression (17).

$$\omega_g = \omega_1 - \omega_m \quad (17)$$

d-, q-axis components $\Phi_{1d}$ and $\Phi_{1q}$ of a primary flux $\Phi_1$ are commonly shown by an expression (18).

$$\left.\begin{array}{l} \Phi_{1d} = L_1 I_{1d} + MI_{2d} \\ \Phi_{1q} = L_1 I_{1q} + MI_{2q} \end{array}\right\} \quad (18)$$

Expressions (19) and (20) are respectively inducted by eliminating $I_{2d}$ and $I_{2q}$ after substituting the expression (18) for the expression (16).

$$\left.\begin{array}{l} V_{1d} = R_1 I_{1d} + P\Phi_{1d} - \omega_1\Phi_{1q} \\ V_{1q} = R_1 I_{1q} + P\Phi_{1q} + \omega_1\Phi_{1d} \end{array}\right\} \quad (19)$$

$$\left.\begin{array}{l} 0 = (R_2 + PL_2)\Phi_{1d} - L_1(R_2 + PL_2\sigma)I_{1d} - \\ L_2\omega_g\Phi_{1q} + \sigma L_1 L_2\omega_g I_{1q} \\ 0 = (R_2 + PL_2)\Phi_{1q} - L_1(R_2 + PL_2\sigma)I_{1q} + \\ L_2\omega_g\Phi_{1d} - \sigma L_1 L_2\omega_g I_{1d} \end{array}\right\} \quad (20)$$

A leakage coefficient $\sigma$ is inducted by an expression (21).

$$\sigma = 1 - M^2/(L_1 L_2) \quad (21)$$

d-, q-axis components of a secondary flux $\Phi_2$ is inducted by an expression (22).

$$\left.\begin{array}{l} \Phi_{2d} = MI_{1d} + L_2 I_{2d} \\ \Phi_{2q} = MI_{1q} + L_2 I_{2q} \end{array}\right\} \quad (22)$$

An expression (23) is inducted by eliminating $I_{2d}$ and $I_{2q}$ from the expressions (18) and (22).

$$\left.\begin{array}{l} \Phi_{1d} = \sigma L_1 I_{1d} + (1-\sigma)L_1\Phi_{2d}/M \\ \Phi_{1q} = \sigma L_1 I_{1q} + (1-\sigma)L_1\Phi_{2q}/M \end{array}\right\} \quad (23)$$

An expression (24) is inducted by eliminating $I_{1d}$ and $I_{1q}$ after substituting the expression (23) for the expression (20).

$$\left.\begin{array}{l} P\Phi_{2d} = -\dfrac{1}{\sigma T_2}\Phi_{2d} + \omega_g\Phi_{2q} + \dfrac{M}{\sigma L_1 T_2}\Phi_{1d} \\ P\Phi_{2q} = -\omega_g\Phi_{2d} - \dfrac{1}{\sigma T_2}\Phi_{2q} + \dfrac{M}{\sigma L_1 T_2}\Phi_{1q} \end{array}\right\} \quad (24)$$

Terms of $\Phi_{1d}$ and $\partial_{1g}$ occur in the right side by differentiating both sides of the expression (24). Accordingly, an expression (25) is inducted by eliminating $P\partial_{1d}$ and $P\Phi_{1q}$ by using the expression (19).

$$\left.\begin{array}{l} P(P\Phi_{2d}) = -\dfrac{1}{\sigma T_2}P\Phi_{2d} + \omega_g P\Phi_{2q} + \Phi_{2q}P\omega_g + \\ \dfrac{M}{\sigma L_1 T_2}(V_{1d} - R_1 I_{1d} + \omega_1\Phi_{1q}) \\ P(P\Phi_{2q}) = -\omega_g P\Phi_{2d} - \dfrac{1}{\sigma T_2}P\Phi_{2q} - \Phi_{2d}P\omega_g + \\ \dfrac{M}{\sigma L_1 T_2}(V_{1q} - R_1 I_{1q} - \omega_1\Phi_{1d}) \end{array}\right\} \quad (25)$$

An expression (26) is inducted in a determinant by eliminating $P\Phi_{1d}$ and $P\Phi_{1q}$ after substituting the expression (24) for the expression (25).

$$P\begin{pmatrix} P\Phi_{2d} \\ P\Phi_{2q} \end{pmatrix} = \begin{pmatrix} -\dfrac{1}{\sigma T_2} & \omega_1 \\ -\omega_1 & -\dfrac{1}{\sigma T_2} \end{pmatrix} \begin{pmatrix} P\Phi_{2d} \\ P\Phi_{2q} \end{pmatrix} + \dfrac{M}{\sigma L_1 T_2} \quad (26)$$

$$\begin{pmatrix} V_{1d} - R_1 I_{1d} + \dfrac{L_1\omega_1}{M}(\Phi_{2q} + \sigma T_2\omega_g\Phi_{2d}) + \dfrac{\sigma L_1 T_2}{M}P(\omega_g\Phi_{2q}) \\ V_{1q} - R_1 I_{1q} - \dfrac{L_1\omega_1}{M}(\Phi_{2d} - \sigma T_2\omega_g\Phi_{2q}) + \dfrac{\sigma L_1 T_2}{M}P(\omega_g\Phi_{2d}) \end{pmatrix}$$

An expression (27) is a characteristic equation of the expression (26).

$$\begin{pmatrix} S + \dfrac{1}{\sigma T_2} & -\omega_1 \\ \omega_1 & S + \dfrac{1}{\sigma T_2} \end{pmatrix} = S^2 + \dfrac{2}{\sigma T_2}S + \omega_1^2 + \left(\dfrac{1}{\sigma T_2}\right)^2 = 0 \quad (27)$$

A natural angle frequency $\omega_{n1}$ and an attenuation factor $\zeta_{n1}$ are inducted by an expression (28).

$$\omega_{n1} = \sqrt{\omega_1^2 + \left(\frac{1}{\sigma T_2}\right)^2} \;, \; \zeta_{n1} = \frac{1}{\sigma T_2 \omega_{n1}} \tag{28}$$

Accordingly, the larger $\omega_1$ becomes, the smaller the attenuation factor $\zeta_n$ becomes, and a response of $P\Phi_{2d}$ and $P\Phi_{2q}$ (the secondary flux $\Phi_{2d}$ and $\Phi_{2q}$) vibrates. The expression (26) is accordingly transformed to an expression (29) to inhibit the vibration by enlarging the attenuation factor.

$$P\begin{pmatrix} P\Phi_{2d} \\ P\Phi_{2q} \end{pmatrix} =$$

$$\begin{pmatrix} -K_d - \frac{1}{\sigma T_2} & \omega_1 \\ -K_q - \omega_1 & -\frac{1}{\sigma T_2} \end{pmatrix} \cdot \begin{pmatrix} P\Phi_{2d} \\ P\Phi_{2q} \end{pmatrix} + \frac{M}{\sigma L_1 T_2}$$

$$\left[ \begin{array}{c} V_{14} - R_1 I_{1d} + \frac{L_1 \omega_1}{M}(\Phi_{2q} + \sigma T_2 \omega_g \Phi_{2d}) + \frac{\sigma L_1 T_2}{M} P(\omega_g \Phi_{2q}) + \frac{\sigma L_1 T_2}{M} K_d P\Phi_{2d} \\ V_{1q} - R1 I_{1q} - \frac{L_1 \omega_1}{M}(\Phi_{2d} - \sigma T_2 \omega_g \Phi_{2q}) + \frac{\sigma L_1 T_2}{M} P(\omega_g \Phi_{2d}) + \frac{\sigma L_1 T_2}{M} K_q P\Phi_{2d} \end{array} \right] \tag{29}$$

As a result, a characteristic equation is an expression (30).

$$\left[ \begin{array}{cc} S + K_d + \frac{1}{\sigma T_2} & -\omega_1 \\ \omega_1 + K_q & S + \frac{1}{\sigma T_2} \end{array} \right] =$$

$$S^2 + \left(K_d + \frac{2}{\sigma T_2}\right)S + \frac{1}{\sigma T_2}\left(K_d + \frac{1}{\sigma T_2}\right) +$$

$$\omega_1 (\omega_1 + K_q) = 0 \tag{30}$$

A natural angle frequency $\omega_{n2}$ and an attenuation factor $\zeta_{n2}$ are inducted by an expression (31).

$$\omega_{n2} = \sqrt{\omega_1(\omega_+ K_q)}$$

$$\zeta_{n2} = \frac{1}{2\sigma T_2 \omega_{n2}}\left(K_d + \frac{1}{\sigma T_2}\right) \tag{31}$$

Accordingly, a damping character of a response of $P\Phi_{2d}$ and $P\Phi_{2q}$ can be ameliorated by controlling values of control gains $K_{cd}$ and $K_{cq}$.

In the expression (29), a term shown by A must be zero to converge $P\Phi_{2d}$ and $P\Phi_{2q}$ on zero. Accordingly, $V_{1d}$ and $V_{1q}$ must be controlled in accordance with an expression (32).

$$V_{1d} = R_1 I_{1d} - \frac{L_1 \omega_1}{M}(\Phi_{2q} + \sigma T_2 \omega_2 \Phi_{2d}) - \frac{\sigma L_1 T_2}{M} P(\omega_2 \Phi_{2q}) - \frac{\sigma L_1 T_2}{M} K_d P\Phi_{2d}$$

$$V_{1q} = R_1 I_{1q} + \frac{L_1 \omega_1}{M}(\Phi_{2d} - \sigma T_2 \omega_2 \Phi_{2q}) - \frac{\sigma L_1 T_2}{M} P(\omega_2 \Phi_{2q}) - \frac{\sigma L_1 T_2}{M} K_q P\Phi_{2d} \tag{32}$$

Since terms relating to a component of the secondary flux $\Phi_{2d}$ and $\Phi_{2q}$, etc. are included in the right side of the expression (32), the secondary flux must be detected by a certain operation to operate or bring about the resultant of expression (32). The primary flux $\Phi_1$ is assumed to be controlled constantly to be a set value, and an expression (33) is assumed.

$$\partial_{1d} = L_1 I_{1d}^*, \partial_{2q} = 0 \tag{33}$$

$\Phi_{2d}$ and $\Phi_{2q}$ are operated by the expression (33). An expression (34) is inducted by substituting the expression (33) for the expression (23).

$$\Phi_{2d} = \frac{M(I_{1d}^* - \sigma I_{1d})}{1 - \sigma}$$

$$\Phi_{2q} = -\frac{\sigma M}{1 - \sigma} I_{1q} \tag{34}$$

An expression (35) is inducted by substituting the expression (33) for the expression (20).

$$\omega_g = \frac{1}{T_2} \cdot \frac{(1 + \sigma T_2 P) I_{1q}}{I_{1d}^* - \sigma I_{1d}} \tag{35}$$

An expression (36) is inducted by substituting the expressions (33) and (35) for the expression (24).

$$P\Phi_{24} = -\frac{M}{T_2(1 - \sigma)} \left[ I_{1d}^* - I_{1d} + \frac{\sigma(I_{1q}^2 + \sigma T_2 I_{1q} P I_{1q})}{I_{1d}^* - \sigma I_{1d}} \right] \tag{35}$$

Considering a steady state, a value of $P(\omega_s \Phi_{2q})$ is assumed to be zero. An expression (37) is inducted by substituting the expressions (34), (35) and (36) for the expression (32).

$$V_{1d} = R_1 I_{1d} + K_{ed} I_{err}$$

$$V_{1q} = R_1 I_{1q} + L_1 \omega_1 I_{1d}^* + (K_0 \omega_1 + K_{eq}) I_{err} \tag{37}$$

$K_0$ and $I_{err}$ are shown by expressions (38) and (39).

$$K_0 = \frac{\sigma L_1}{1 - \sigma}, \; K_{ed} = K_0 K_d, \; K_{eq} = K_0 K_q \tag{38}$$

$$I_{err} = I_{1d}^* - I_{1d} + \frac{\sigma I_{1q}^2}{I_{1d}^* - \sigma I_{1d}} \quad (39)$$

In the steady state, values of $P\Phi_{2d}$ and $PI_{1q}$ are zero. Accordingly, a value of $I_{err}$ inducted by the expressions (36)-(39) is zero. Namely, when the expression (33) consists, the value of $I_{err}$ is zero.

In the expression (37), $V_{1d}$ and $V_{1q}$ can be operated by inducting $I_{1d}^*$, $I_{1d}$, and $I_{1q}$ without detecting $\Phi_{2d}$ and $\Phi_{2q}$. A response characteristic in a control system when the primary voltage in the induction motor is controlled in accordance with the expression (37) can be decided by controlling values of the control gains $K_{ed}$ and $K_{eq}$.

An operation of the above embodiment of the invention will be described with reference to FIG. 5–FIG. 8. As shown in FIG. 5, a no-load voltage command $V_{1q0}^*$ is outputted by the multiplier 13. Namely, after the exciting current command $I_{1d}^*$ outputted from the exciting current command setting device 4 through the input terminal 11 is inputted in the coefficient device 12, a no-load voltage command $V_{1q0}^*$ ($=L_1 \omega_1^* I_{1d}^*$) corresponding to the second term in the right side in the expression of $V_{1q}$ in the expression (37) is induced by multiplying the output from the coefficient device 12 and the primary frequency command $\omega_1^*$ inputted from the frequency command generator 22 through the input terminal 10 by the multiplier 13, which is outputted from the output terminal 14.

As shown in FIG. 6, the error current component $I_{err}$, the d-axis component $I_{1d}$, and the q-axis component $I_{1q}$ of the primary current are outputted from the error current component processing circuit 6. Namely, the primary currents $I_{1u}$ and $I_{1v}$ in the induction motor 1 detected by the current detector 2 are respectively inputted to the input terminals 31 and 32, and the expression (9) is operated by the coefficient devices 34–36 and the adder 37. As a result, the $\alpha$-axis component $I_{1\alpha}$ and the $\beta$-axis component $I_{1\beta}$ of the primary current are respectively outputted from the coefficient device 34 and the adder 37. On one hand, the primary frequency command $\omega_1^*$ in an analog amount outputted from the frequency command generator 22 is inputted to the V/F converter 38 through the input terminal 33, a pulse train signal frequency of which is proportional to the primary frequency command $\omega_1^*$ is generated, and an angle command $\theta_1^*$ in a digital amount which is a time integral value of the primary frequency command $\omega_1^*$ is inducted by the counter 39 and is inputted as an address of the ROM 40 in which values of $\sin \theta_1^*$ and $\cos \theta_1^*$ are memorized or stored. As a result, a digital amount of $\sin \theta_1^*$ and $\cos \theta_1^*$ is outputted from the ROM 40. The $\alpha$-axis component $I_{1\alpha}$ and the $\beta$-axis component $I_{1\beta}$ of the primary current outputted from the coefficient device 34 and the adder 37, and the digital amount of $\sin \theta_1^*$ and $\cos \theta_1^*$ outputted from the ROM 40 are inputted to the multiplying D/A converters 41–44, and are multiplied and converted to analog data. An expression (40) which is an inverse operating expression of the expression (13) is operated by inputting the analog data to the adder 45 and the subtracter 46, and the d-axis component $I_{1d}$ and the q-axis component $I_{1q}$ of the primary current are inducted.

$$\left. \begin{array}{l} I_{1d} = I_1 \alpha \cos\theta_1^* + I_1 \beta \sin\theta_1^* \\ I_{1q} = -I_1 \alpha \sin\theta_1^* + I_1 \beta \cos\theta_1^* \end{array} \right\} \quad (40)$$

The expression (39) is operated by the coefficient devices 47 and 50, the multiplier 49, the divider 51, the adder 52, and the subtracter 53 in accordance with $I_{1d}$ and $I_{1q}$, and the exciting current command $I_{1d}^*$ inputted from the exciting current command setting device 4 through the input terminal 30. The error current component $I_{err}$ outputted from the subtracter 53 is outputted from the output terminal 54. $I_{1d}$ and $I_{1q}$ outputted from the adder 45 and the subtracter 46 are respectively outputted from the output terminals 55 and 56.

As shown in FIG. 7, a d-axis compensation voltage component $\Delta V_{1d}$ and a q-axis compensation voltage component $\Delta V_{1q}$ are outputted from the compensation voltage component processing circuit 7. Namely, the d-axis component $I_{1d}$ of the primary current, the error current component $I_{err}$, and the q-axis component $I_{1q}$ of the primary current are inputted from the error current component processing circuit 6 through the input terminals 60, 61, and 63 respectively. As a result, an operation of the right side of the expression of $V_{1d}$ in the expression (37) is carried out by the coefficient device 164, the amplifier 65, and the adder 66, which is outputted as the d-axis compensation voltage component $\Delta V_{1d}$ from the output terminal 73. On one hand, an operation of the third term of the right side of the expression of $V_{1q}$ in the expression (37) is carried out, in accordance with the error current component $I_{err}$ and the primary frequency command $\omega_1^*$ inputted from the frequency command generator 22 through the input terminal 62, by the amplifier 67, the coefficient device 68, the multiplier 69, and the adder 70. Also, an operation of the first term of the right side of the expression of $V_{1q}$ in the expression (37) by the coefficient device 171 is carried out. A voltage component without the no-load voltage, which is a voltage of the second term of the right side of the expression of $V_{1q}$ in the expression (37), is outputted from the output terminal 74 as the q-axis compensation voltage component $\Delta V_{1q}$ by adding the output from the adder 70 and the coefficient device 171 by the adder 72.

As shown in FIG. 8, primary voltage commands $V_{1u}^*$, $V_{1v}^*$, and $V_{1w}^*$ are outputted from the primary voltage command processing circuit 8. Namely, the d-axis compensation voltage component $\Delta V_{1d}$ and the q-axis compensation voltage component $\Delta V_{1q}$ are respectively inputted from the compensation voltage component processing circuit 7 through the input terminals 80 and 81. As shown in the expression (37), $\Delta V_{1d}$ can be regarded as a d-axis component command $V_{1d}^*$ of the primary voltage, since the d-axis component of the primary voltage is zero in a no-load state. On one hand, by the adder 84, the no-load voltage command $V_{1q0}^*$ inputted from the no-load voltage processing circuit 5 through the input terminal 82 is added to the q-axis compensation voltage component $\Delta V_{1q}$, and an operation of the right side of the expression of $V_{1q}$ in the expression (37) is carried out, which is outputted as a q-axis component command $V_{1q}^*$ of the primary voltage. The primary frequency command $\omega_1^*$ is inputted from the frequency command generator 22 through the input terminal 83, and digital values of $\sin \theta_1^*$ and $\cos \theta_1^*$ are outputted from the ROM 87 by the same operation as one in the compensation current component processing circuit 6. The d-axis component command $V_{1d}^*$ of the primary voltage inputted through the input terminal 80, the q-axis component command $V_{1q}^*$ of the primary voltage outputted from the adder 84, and a digital amount of $\sin\theta_1^*$ and $\cos\theta_1^*$ outputted from the ROM 87 are inputted to the multiplying D/A converters 88-91, are multiplied and converted to an analog data, and thereafter are inputted to the subtracter 92 and the adder 93. As a result, the expression (12) is operated and an $\alpha$-axis component command $V_{1\alpha}^*$ and a $\beta$-axis component command $V_{1\beta}^*$ of the primary voltage are inducted. By the coefficient devices 94, 97-99, the subtracter 95, and the adder 96, the expression (8) is operated, and the primary voltage command $V_{1u}^*$, $V_{1v}^*$, and $V_{1w}^*$ are respectively outputted from the output terminals 100-102. An actual value of the primary voltage to be impressed on the induction motor 1 is controlled to comply with the primary voltage command by the same operation as that in the conventional device by inputting the primary voltage command $V_{1u}^*$, $V_{1v}^*$, and $V_{1w}^*$ to the variable-frequency power converting circuit 3.

In this embodiment, the potential drop by the primary resistance $R_1$ is compensated in the compensation voltage processing circuit by using the d-axis component $I_{1d}$ and the q-axis component $I_{1q}$ of the primary current. The potential drop can also be compensated by using the primary currents $I_{1u}$ and $I_{1v}$ detected by the current detector 2 by changing the structures of the compensation voltage processing circuit 7 and the primary voltage command processing circuit 8 to those shown in FIG. 9 and FIG. 10 respectively.

Figure 9:
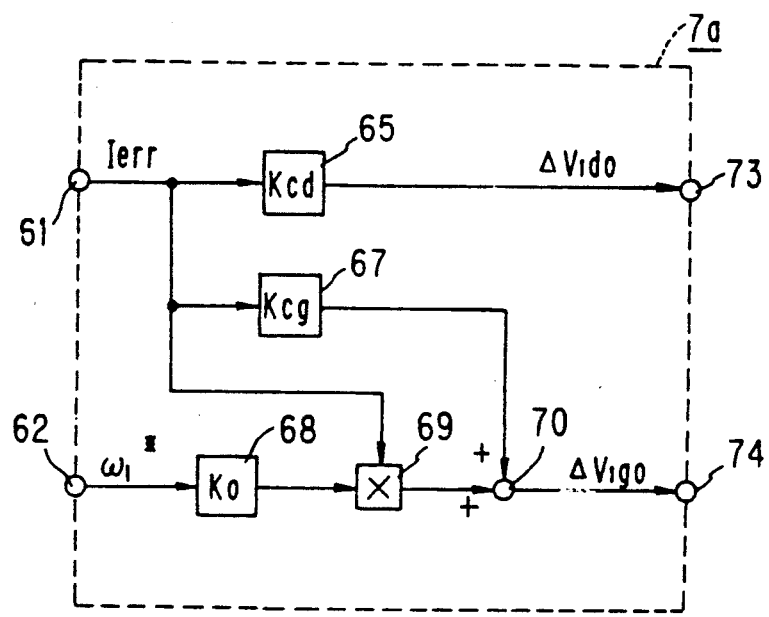
FIG. 9 is a block diagram showing another example of a structure of a compensation voltage processing circuit shown in FIG. 4.

Namely, in a compensation voltage processing circuit 7a shown in FIG. 9, only the voltage component relating to the error current component $I_{err}$ in the expression (37) is operated, which is outputted as a d-axis compensation voltage component $\Delta V_{1d0}$ and a q-axis compensation voltage component $\Delta V_{1q0}$. Namely, $\Delta V_{1d0}$ and $\Delta V_{1q0}$ are inducted from an expression (41).

$$\left. \begin{array}{l} \Delta V_{1d0} = K_{ed}I_{err} \\ \Delta V_{1q0} = (K_0\omega_1^* + K_{eq})I_{err} \end{array} \right\} \quad (41)$$

Figure 10:
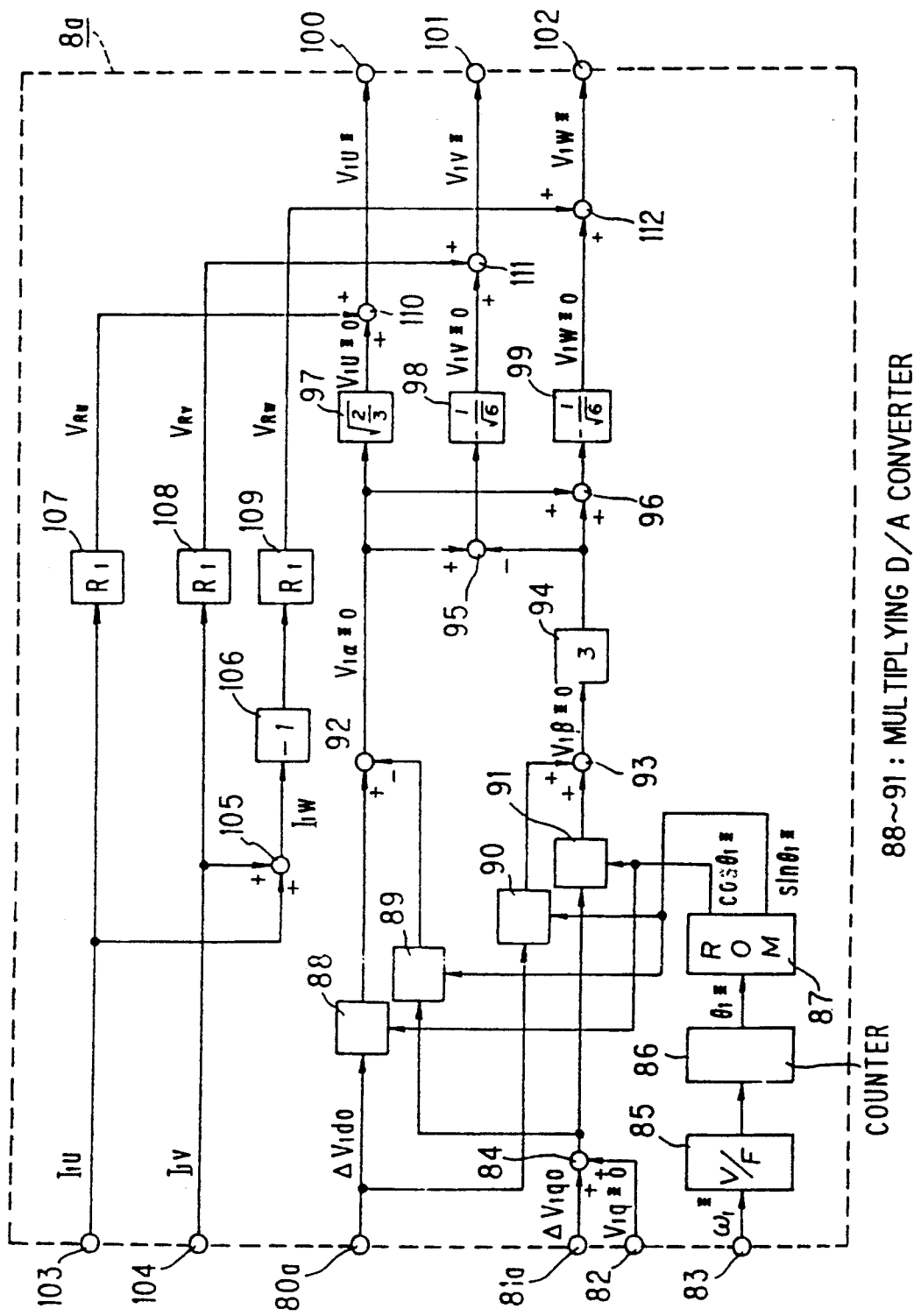
FIG. 10 is a block diagram showing another example of a structure of a primary voltage command processing circuit shown in FIG. 4.

The compensation voltage components $\Delta V_{1d0}$ and $\Delta V_{1q0}$ are inputted to a primary voltage command processing circuit 8a shown in FIG. 10 through input terminals 80a and 81a. As a result, the primary voltage commands $V_{1u}^*$, $V_{1v}^*$, and $V_{1w}^*$ which neglect the potential drop value by the primary resistance $R_1$ are respectively outputted from the coefficient devices 97-99.

The primary current in a U-phase outputted from the current detector 2 through an input terminal 103 is inputted to a coefficient device 107, and a potential drop value $V_{RU}$ by the primary resistance $R_1$ in the U-phase is obtained, which is added to $V_{1u0}^*$ by an adder 110. As a result, the primary voltage command $V_{1u}^*$ in the U-phase including the potential drop value by the primary resistance $R_1$ is outputted from the output terminal 100.

Similarly, the primary voltage command $V_{1v}^*$ in a V-phase including the potential drop value by the primary resistance $R_1$ is inducted by an adder 111 by inputting the primary current in the V-phase outputted from the current detector 2 through an input terminal 104 to a coefficient device 108, is outputted from the output terminal 101.

With respect to a W-phase, the primary current $I_{1w}$ in the W-phase is inducted from the primary current $I_{1u}$ and $I_{1v}$ by an adder 105 and a sign inverting device 106 by using an expression (42) which is commonly known. The primary voltage command $V_{1w}^*$ in the W-phase including the potential drop value by the primary resistance $R_1$ is inducted by a coefficient device 109 and an adder 112, and is outputted from the output terminal 102.

$$I_{1w} = -(I_{1u} + I_{1v}) \quad (42)$$

Alternatively, the potential drop value by the primary resistance $R_1$ can be compensated in the primary voltage command processing circuit by using the $\alpha$-axis component $I_{1\alpha}$ and the $\beta$-axis component $I_{1\beta}$ of the primary current, similarly to the above embodiment.

The error current $I_{err}$ shown in the expression (39) is not zero, unless the actual value of the primary flux in the induction motor 1 coincides with a set value $L_1I_{1d}^*$. By setting gains $K_{ed}$ and $K_{eq}$ of the amplifiers 65 and 67 appropriately high in the compensation voltage processing circuit shown in FIG. 7 and FIG. 9, or by using a PI processing type amplifier, even though the potential drop value by the primary resistance $R_1$ is not compensated by using the primary current as in the detailed first embodiment, the value of the error current $I_{err}$ is controlled to approximate to zero, accordingly, the actual value of the primary flux approximately coincides with the set value $L_1I_{1d}^*$. Accordingly, it is not necessary to compensate the potential drop value of the primary resistance $R_1$ by using the primary current in this case. Further, the potential drop value by the primary resistance $R_1$ can be previously compensated in the no-load voltage processing circuit, similarly in the conventional controller.

A second embodiment of the invention will be described in accordance with the drawings.

Figure 11:
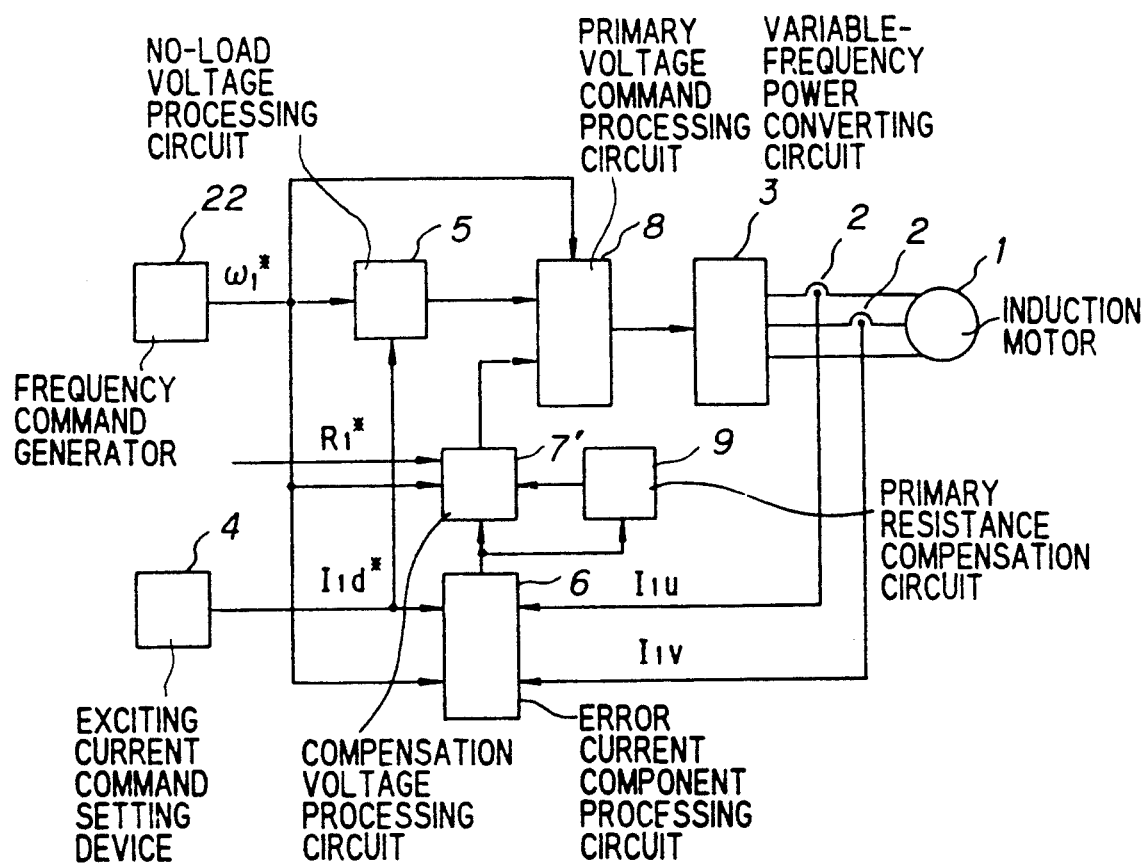
FIG. 11 is a block diagram showing a structure of a second embodiment of a controller for an induction motor in accordance with the present invention.

FIG. 11 is a block diagram showing a whole structure of the second embodiment of the invention, wherein numeral 1 denotes an induction motor, numeral 2 denotes a current detector, numeral 3 denotes a variable-frequency power converting circuit, which comprises a transistor inverter circuit 21 and a PWM circuit 25, for example, as in the conventional controller, numeral 4 denotes an exciting current command setting device, numeral 5 denotes a no-load voltage processing circuit, numeral 6 denotes an error current component processing circuit, numeral 7' denotes a compensation voltage processing circuit, numeral 8 denotes a primary voltage command processing circuit, numeral 9 denotes a primary resistance compensation circuit. A structure of a frequency command generator 22 is the same as one in the conventional controller for an induction motor.

The structure of the no-load voltage processing circuit 5 is the same as one shown in FIG. 5, wherein the no-load voltage processing circuit 5 comprises:
an input terminal 10 connected to the frequency command generator 22,
an input terminal 11 connected to the exciting current command setting device 4,
a coefficient device 12,
a multiplier 13, and
an output terminal 14.

The structure of the error current component processing circuit 6 is the same as one shown in FIG. 6, wherein the error current component processing circuit 6 comprises:
- an input terminal 30 connected to the exciting current command setting device 4,
- input terminals 31 and 32 connected to the current detector 2,
- an input terminal 33 connected to the frequency command generator 22,
- coefficient devices 34, 35, 36, 47, and 50,
- adders 37, 45, and 52,
- a V/F converter 38,
- a counter 39,
- a ROM 40,
- multiplying D/A converters 41–44,
- subtracters 46, 48, and 53,
- a multiplier 49,
- a divider 51, and
- output terminals 54–56.

Figure 12:
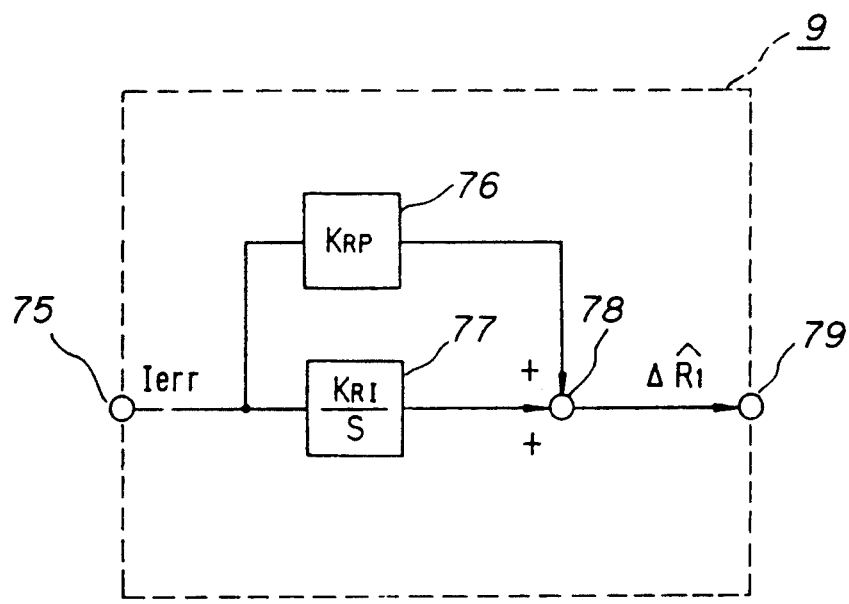
FIG. 12 is a block diagram showing an example of a structure of a primary resistance compensating circuit shown in FIG. 11.

FIG. 12 is a block diagram showing in detail the structure of the primary resistance compensation circuit 9, wherein the primary resistance compensation circuit 9 comprises:
- an input terminal 75 connected to the error current component processing circuit 6,
- an amplifier 76,
- an amplifying integral device 77,
- an adder 78, and
- an output terminal 79.

Figure 13:
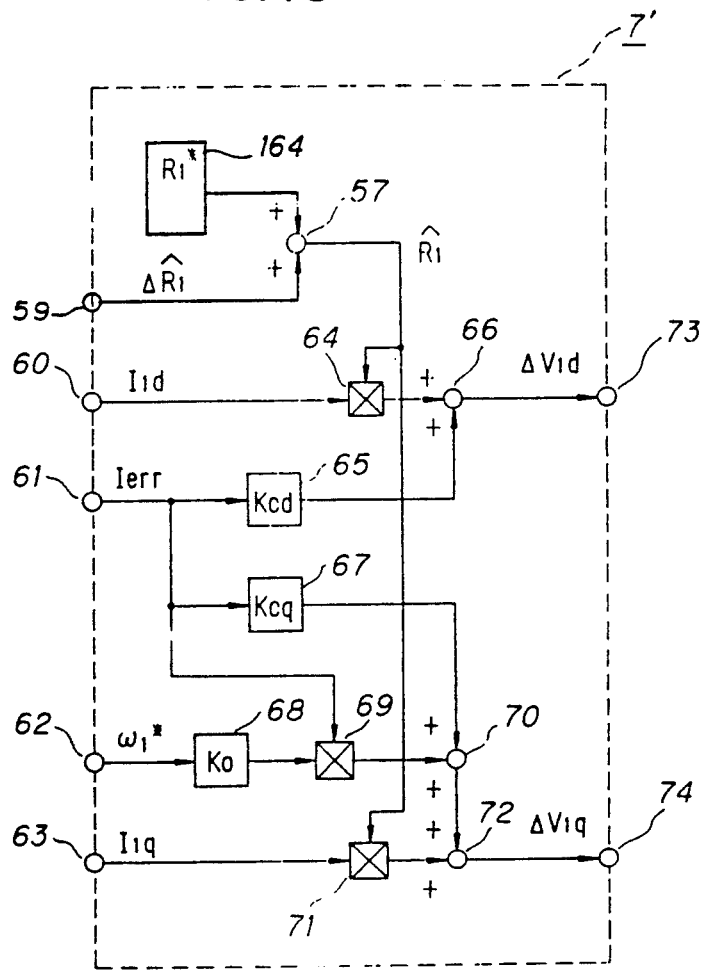
FIG. 13 is a block diagram showing an example of a structure of a compensation voltage processing circuit shown in FIG. 11.

FIG. 13 is a block diagram showing in detail the structure of the compensation voltage processing circuit 7', wherein the compensation voltage processing circuit 7' comprises:
- an input terminal 59 connected to the primary resistance compensation circuit 9,
- input terminals 60, 61, and 63 connected to the error current component processing circuit 6,
- an input terminal 62 connected to the frequency command generator 22,
- multipliers 64, 69, and 71,
- amplifiers 65 and 67,
- adders 57, 66, 70, and 72,
- a coefficient device 68, and
- output terminals 73 and 74.

The structure of the primary voltage command processing circuit 8 is the same as one shown in FIG. 8, wherein the primary voltage command processing circuit 8 comprises:
- input terminals 80 and 81 connected to the compensation voltage processing circuit 7',
- an input terminal 82 connected to the no-load voltage processing circuit 5,
- an input terminal 83 connected to the frequency command generator 22,
- adders 84, 93, and 96,
- a V/F converter 85,
- a counter 86,
- a ROM 87,
- multiplying D/A converters 88–91,
- subtracters 92 and 95,
- coefficient devices 94, 97–99, and
- output terminals 100–102.

A control system of the induction motor in the second embodiment of the invention will be described as follows. Since the expressions (7)–(21) in the first embodiment of the invention are the same as those in the second embodiment of the invention, the expressions following the expression (21) will be described as follows.

The primary flux $\Phi_1$ is assumed to be controlled constantly in accordance with the set value, and an expression (43) is assumed.

$$\Phi_{1d} = L_1 I_{1d}^*, \quad \Phi_{1q} = 0 \tag{43}$$

$I_{1d}^*$ is the exciting current command value. Considering a steady state, when a differential operator P=0, an expression (44) is inducted by substituting the expression (43) for the expression (19). An expression (45) is inducted by substituting the expression (43) for the expression (20).

$$\left. \begin{array}{l} V_{1d} = R_1 I_{1d} \\ V_{1q} = R_1 I_{1q} + L_1 \omega_1 I_{1d}^* \end{array} \right\} \tag{44}$$

$$0 = I_{1d}^* - I_{1d} + \frac{\sigma I_{1q}^2}{I_{1d}^* - \sigma I_{1d}} \tag{45}$$

Accordingly, the expression (43) consists in the steady state by inducting $V_{1d}$ and $V_{1q}$ from the expression (44), and the primary flux $\Phi_1$ is controlled constantly in accordance with the set value.

A term to make the right side of the expression (45) zero is added, since the expression (45) is consisted by $I_{1d}$ and its command value $I_{1d}^*$ if the expression (43) consists, for ameliorating a damping character of the control system and for improving a stabilization ability. As a result, an expression (46) is inducted.

$$\left. \begin{array}{l} V_{1d} = R_1^* I_{1d} + K_{cd} I_{err} \\ V_{1q} = R_1^* I_{1q} + L_1 \omega_1 I_{1d}^* + (K_0 \omega_1 + K_{cq}) I_{err} \end{array} \right\} \tag{46}$$

$$K_0 = \frac{\sigma L_1}{1 - \sigma}, \quad K_{cd} = K_0 K_d, \quad K_{cq} = K_0 K_q$$

$$I_{err} = I_{1d}^* - I_{1d} + \frac{\sigma I_{1q}^2}{I_{1d}^* - \sigma I_{1d}}$$

The setting value $R_1^*$ of the primary resistance $R_1$ is included in the expression (46). A true value of $R_1$ can not be set all the time, since $R_1$ varies by temperature. Accordingly, a deterioration of a controlling character by a set error of $R_1^*$ is inhibited, by carrying out a control in accordance with a control rule of the expression (46), even though $R_1^*$ has an error in regard to the true value. However, in a low frequency, the deterioration of the controlling character by the set error of $R_1^*$ is larger than in a high frequency.

In the second embodiment of the invention, when $R_1^*$ has an error in regard to the true value, the current error $I_{err}$ shown in the expression (46) is not zero, and $I_{err}$ is proportioned and integrated by a gain previously set, which is processed as a compensation amount $\Delta R_1$ of the primary resistance set value $R_1^*$.

Namely, the compensation amount $\Delta R_1$ of the primary resistance set value $R_1^*$ is processed by an expression (47), and a primary resistance presumption value $R_1$ is inducted by adding $R_1^*$ as shown in an expression (48). An expression (49) consists by replacing $R_1^*$ in the expression (46) by $R_1$ inducted by the expression (48).

$$\Delta R_1 = \left(K_{RP} + \frac{K_{RI}}{S}\right) I_{err} \quad (47)$$

$$R_1 = R_1^* + \Delta R_1 \quad (48)$$

$$\left. \begin{array}{l} V_{1d} = R_1 \; I_{1d} + K_{cd} I_{err} \\ V_{1q} = R_1 \; I_{1q} + L_1 \omega_1^* I_{1d}^* + (K_0 \omega_1 + K_{cq}) I_{err} \end{array} \right\} \quad (49)$$

In the control system in the second embodiment of the invention, the primary flux $\Phi_1$ is controlled constantly in accordance with the set value by an automatic compensation, even though the primary resistance varies by a temperature, and the induction motor can be properly controlled.

An operation of the above second embodiment in the invention will be described with reference to FIGS. 5, 6, 8, 12, and 13. As shown in FIG. 5, a no-load voltage command $V_{1q0}^*$ is outputted by the multiplier 13. Namely, after the exciting current command $I_{1d}^*$ outputted from the exciting current command setting device 4 through the input terminal 11 is inputted in the coefficient device 12, a no-load voltage command $V_{1q0}^*$ ($=L_1\omega_1^* I_{1d}^*$) corresponding to the second term in the right side in the expression of $V_{1q}$ in the expression (49) is induced by multiplying the output from the coefficient device 12 and the primary frequency command $\omega_1^*$ inputted from the frequency command generator 22 through the input terminal 10 by the multiplier 13, which is outputted from the output terminal 14.

As shown in FIG. 6, the error current component $I_{err}$, the d-axis component $I_{1d}$, and the q-axis component $I_{1q}$ of the primary current are outputted from the error current component processing circuit 6. Namely, the primary current $I_{1u}$ and $I_{1v}$ in the induction motor 1 detected by the current detector 2 are respectively inputted to the input terminals 31 and 32, and the expression (9) is operated by the coefficient devices 34–36 and the adder 37. As a result, the $\alpha$-axis component $I_{1\alpha}$ and the $\beta$-axis component $I_{1\beta}$ of the primary current are respectively outputted from the coefficient device 34 and the adder 37. On one hand, the primary frequency command $\omega_1^*$ in an analog amount outputted from the frequency command generator 22 is inputted to the V/F converter 38 through the input terminal 33, a pulse train signal frequency of which is proportional to the primary frequency command $\omega_1^*$ is generated, and an angle command $\theta_1^*$ in a digital amount which is a time integral value of the primary frequency command $\omega_1^*$ is inducted by the counter 39 and is inputted as an address of the ROM 40 in which values of sin $\theta_1^*$ and cos $\theta_1^*$ are memorized. As a result, a digital amount of sin $\theta_1^*$ and cos $\theta_1^*$ is outputted from the ROM 40. The $\alpha$-axis component $I_{1\alpha}$ and the $\beta$-axis component $I_{1\beta}$ of the primary current outputted from the coefficient device 34 and the adder 37, and the digital amount of sin $\theta_1^*$ and cos $\theta_1^*$ outputted from the ROM 40 are inputted to the multiplying D/A converters 41–44, and are multiplied and converted to an analog data. An expression (50) which is an inverse operating expression of the expression (13) is operated by inputting the analog data to the adder 45 and the subtracter 46, and the d-axis component $I_{1d}$ and the q-axis component $I_{1q}$ of the primary current are inducted.

$$\left. \begin{array}{l} I_{1d} = I_1 \alpha \cos\theta_1^* + I_1 \beta \sin\theta_1^* \\ I_{1q} = -I_1 \alpha \sin\theta_1^* + I_1 \beta \cos\theta_1^* \end{array} \right\} \quad (50)$$

The expression (25) is operated by the coefficient devices 47 and 50, the multiplier 49, the divider 51, the adder 52, and the subtracter 53 in accordance with $I_{1d}$ and $I_{1q}$, and the exciting current command $I_{1d}^*$ inputted from the exciting current command setting device 4 through the input terminal 30. The error current component $I_{err}$ outputted from the subtracter 53 is outputted from the output terminal 54. $I_{1d}$ and $I_{1q}$ outputted from the adder 45 and the subtracter 46 are respectively outputted from the output terminal 55 and 56.

As shown in FIG. 12, the compensation amount $\Delta R_1$ of the primary resistance set value $R_1^*$ is outputted from the primary resistance compensation circuit 9. Namely, the error current component $I_{err}$ is outputted from the error current component processing circuit 6 through the input terminal 75. As a result, the operation of the expression (47) is carried out by the amplifier 76, the amplifying integral device 77, and the adder 78, which is outputted from the output terminal 79 as the compensation amount $\Delta R_1$ of the primary resistance set value $R_1^*$.

As shown in FIG. 13, the d-axis compensation voltage component $\Delta V_{1d}$ and the q-axis compensation voltage component $\Delta V_{1q}$ are outputted from the compensation voltage component processing circuit 7'. Namely, the primary resistance set value $R_1^*$ is outputted from the coefficient device 164, and the compensation amount $\Delta R_1$ of the primary resistance set value $R_1^*$ is outputted from the primary resistance compensation circuit 9 through the input terminal 59. As a result, the operation of the expression (48) is carried out, and the primary resistance presumption value $R_1$ is outputted from the adder 57. The d-axis component $I_{1d}$ of the primary current, the error current component $I_{err}$, and the q-axis component $I_{1q}$ of the primary current are respectively outputted from the error current component processing circuit 6 through the input terminals 60, 61, and 63.

As a result, the operation of the right side of $V_{1d}$ in the expression (49) is carried out by the multiplier 64, the amplifier 65, and the adder 66, which is outputted as the d-axis compensation voltage component $\Delta V_{1d}$ from the output terminal 73. On one hand, the operation of the third term of the right side of $V_{1q}$ in the expression (49) is carried out in accordance with the error current component $I_{err}$ and the primary frequency command $\omega_1^*$ outputted from the frequency command generator 22 through the input terminal 62, by the amplifier 67, the coefficient device 68, the multiplier 69, and the adder 70. The operation of the first term of the right side of $V_{1q}$ in the expression (49) is carried out by the multiplier 71. The voltage of the second term of the right side of $V_{1q}$ in the expression (49), namely, the voltage component except the no-load voltage, is outputted as the q-axis compensation voltage component $\Delta V_{1q}$ from the output terminal 74 by adding the output from the adder 70 and the multiplier 71 by the adder 72.

As shown in FIG. 8, primary voltage command $V_{1u}^*$, $V_{1v}^*$, and $V_{1w}^*$ are outputted from the primary voltage command processing circuit 8. Namely, the d-axis compensation voltage component $\Delta V_{1d}$ and the q-axis compensation voltage component $\Delta V_{1q}$ are respectively inputted from the compensation voltage component processing circuit 7 through the input terminals 80 and 81. As shown in the expression (49), $\Delta V_{1d}$ can be regarded as a d-axis component command $V_{1d}^*$ of the primary voltage, since the d-axis component $\Delta V_{1d}$ of the primary voltage is zero in a no-load state. On one hand, by the adder 84, the no-load voltage command $V_{1q0}^*$ inputted from the no-load voltage processing circuit 5 through the input terminal 82 is added to the q-axis compensation voltage component $\Delta V_{1q}$, and an operation of the right side of the expression of $V_{1q}$ in the expression (49) is carried out, which is outputted as a q-axis component command $V_{1q}^*$ of the primary voltage. The primary frequency command $\omega_1^*$ is inputted from the frequency command generator 22 through the input terminal 83, and digital values of $\sin\theta_1^*$ and $\cos\theta_1^*$ are outputted from the ROM 87 by the same operation as one in the compensation current component processing circuit 6. The d-axis component command $V_{1d}^*$ of the primary voltage inputted through the input terminal 80, the q-axis component command $V_{1q}^*$ of the primary voltage outputted from the adder 84, and a digital amount of $\sin\theta_1^*$ and $\cos\theta_1^*$ outputted from the ROM 87 are inputted to the multiplying D/A converters 88-91, are multiplied and converted to an analog data, and thereafter are inputted to the subtracter 92 and the adder 93. As a result, the expression (12) is operated and an $\alpha$-axis component command $V_{1\alpha}^*$ and a $\beta$-axis component command $V_{1\beta}^*$ of the primary voltage are inducted. By the coefficient devices 94, 97-99, the subtracter 95, and the adder 96, the expression (8) is operated, and the primary voltage command $V_{1u}^*$, $V_{1v}^*$, and $V_{1w}^*$ are respectively outputted from the output terminals 100-102. An actual value of the primary voltage to be impressed on the induction motor 1 is controlled to comply with the primary voltage command by the same operation as one in the conventional device by inputting the primary voltage command $V_{1u}^*$, $V_{1v}^*$, and $V_{1w}^*$ to the variable-frequency power converting circuit 3.

In this embodiment, the potential drop by the primary resistance $R_1$ is compensated in the compensation voltage processing circuit by using the d-axis component $I_{1d}$ and the q-axis component $I_{1q}$ of the primary current. The potential drop can also be compensated by using the primary current $I_{1u}$ and $I_{1v}$ detected by the current detector 2 by changing the structures of the compensation voltage processing circuit 7' and the primary voltage command processing circuit 8 to those shown in FIG. 9 and FIG. 14 respectively.

Namely, in a compensation voltage processing circuit 7a shown in FIG. 9, only the voltage component relating to the error current component $I_{err}$ in the expression (49) is operated, which is outputted as a d-axis compensation voltage component $\Delta V_{1d0}$ and a q-axis compensation voltage component $\Delta V_{1q0}$. Namely, $\Delta V_{1d0}$ and $\Delta V_{1q0}$ are inducted from an expression (51).

$$\left. \begin{array}{l} \Delta V_{1d0} = K_{cd}I_{err} \\ \Delta V_{1q0} = (K_0\omega_1^* + K_{cq})I_{err} \end{array} \right\} \quad (51)$$

Figure 14:
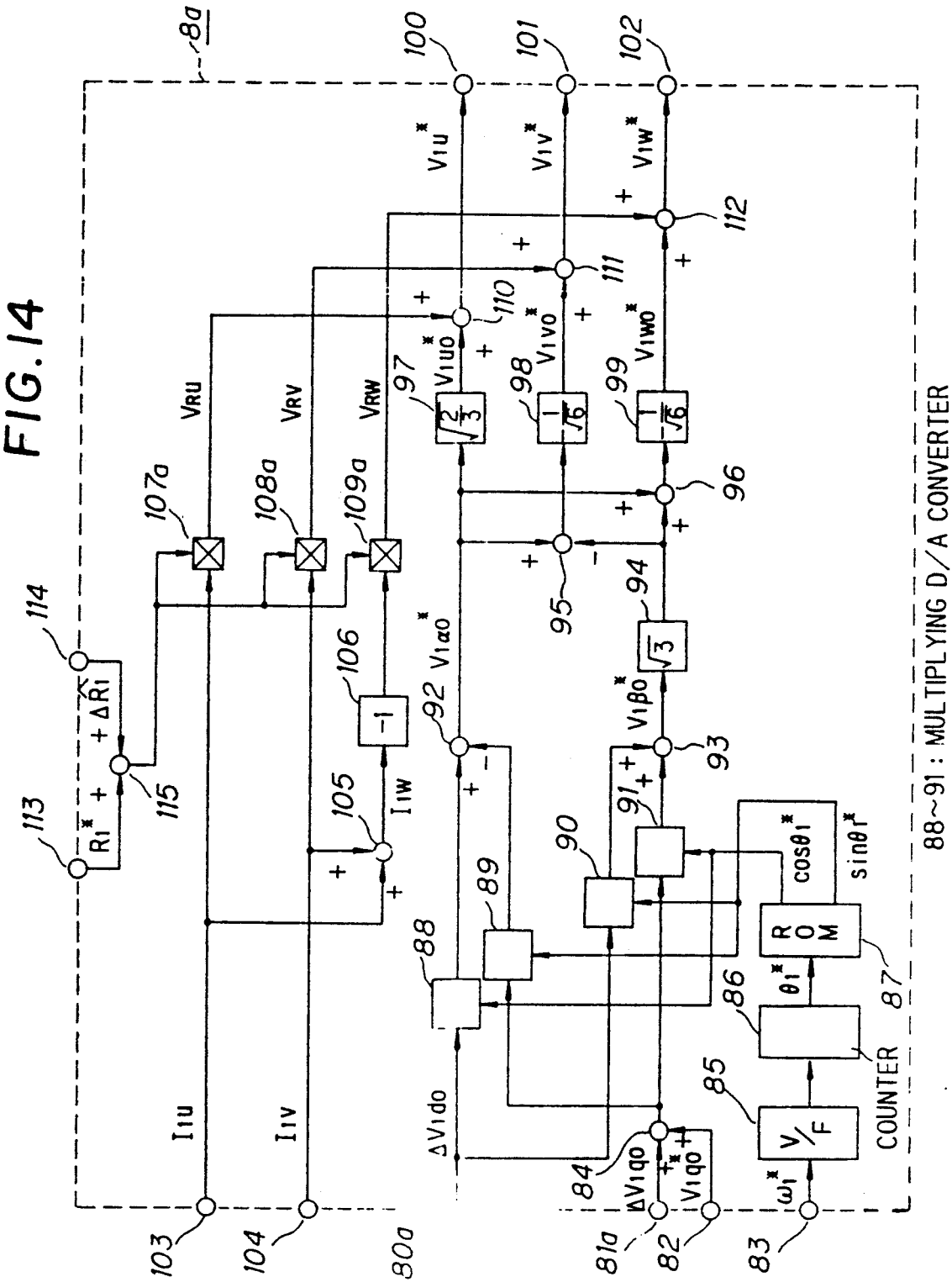
FIG. 14 is a block diagram showing an example of a structure of a primary voltage command processing circuit shown in FIG. 1.

The compensation voltage components $\Delta V_{1d0}$ and $\Delta V_{1q0}$ are inputted to a primary voltage command processing circuit 8a shown in FIG. 14 through input terminals 80a and 81a. As a result, the primary voltage command $V_{1u}^*$, $V_{1v}^*$, and $V_{1w}^*$ which neglect the potential drop value by the primary resistance $R_1$ are respectively outputted from the coefficient devices 97-99.

The primary resistance set value $R_1^*$ is outputted through the input terminal 103, and the compensation amount $\Delta R_1$ of the primary resistance set value $R_1^*$ is outputted from the primary resistance compensation circuit 9 through the input terminal 104, and the primary resistance presumption value $R_1$ is outputted from the adder 115. The primary current in a U-phase outputted from the current detector 2 through an input terminal 103 is inputted to a multiplier 107a, and a potential drop value $V_{RU}$ by the primary resistance $R_1$ in the U-phase is obtained, which is added to $V_{1u0}^*$ by an adder 110. As a result, the primary voltage command $V_{1u}^*$ in the U-phase including the potential drop value by the primary resistance $R_1$ is outputted from the output terminal 100.

Similarly, the primary current in the V-phase outputted from the current detector 2 through the input terminal 104 and the output from the adder 115 are multiplied by the multiplier 108a, and the potential drop value $V_{VU}$ by the primary resistance $R_1$ in the V-phase is obtained. $V_{1v0}^*$ is added thereto by the adder 111, and the primary voltage command $V_{1v}^*$ in the V-phase including the potential drop value by the primary resistance $R_1$ is outputted from the output terminal 101.

With regard to the W-phase, the primary current $I_{1w}$ of the W-phase is inducted from the primary current $I_{1u}$ and $I_{1v}$ by the adder 105 and the sign reversing device 106 by using an expression (52) which is commonly known. The primary current of the W-phase which is an output from the sign reversing device 106 and the output from the adder 115 are multiplied in the multiplier 109a, and the potential drop value $V_{WU}$ by the primary resistance $R_1$ of the W-phase is obtained. As a result, the primary voltage command $V_{1w}^*$ in the W-phase including the potential drop value by the primary resistance $R_1$ is outputted from the output terminal 102 by adding $V_{WU}$ to $V_{1w0}^*$ by the adder 112.

$$I_{1W} = -(I_{1u} + I_{1v}) \quad (52)$$

The primary resistance compensation circuit 9 comprises the amplifier and the amplifying integral device in this embodiment. However, it can comprise only the amplifying integral device. Alternatively, the potential drop value by the primary resistance can be compensated in the primary voltage command processing circuit by using the $\alpha$-axis component $I_{1\alpha}$ and the $\beta$-axis component $I_{1\beta}$ of the primary current. Further, the primary current $I_{1w}$ is inducted by the operation in accordance with $I_{1u}$ and $I_{1v}$ in this embodiment, however, it can be inducted by using the value detected by the current detector. The gain in the amplifiers 65 and 67 can be zero.

Figure 15:
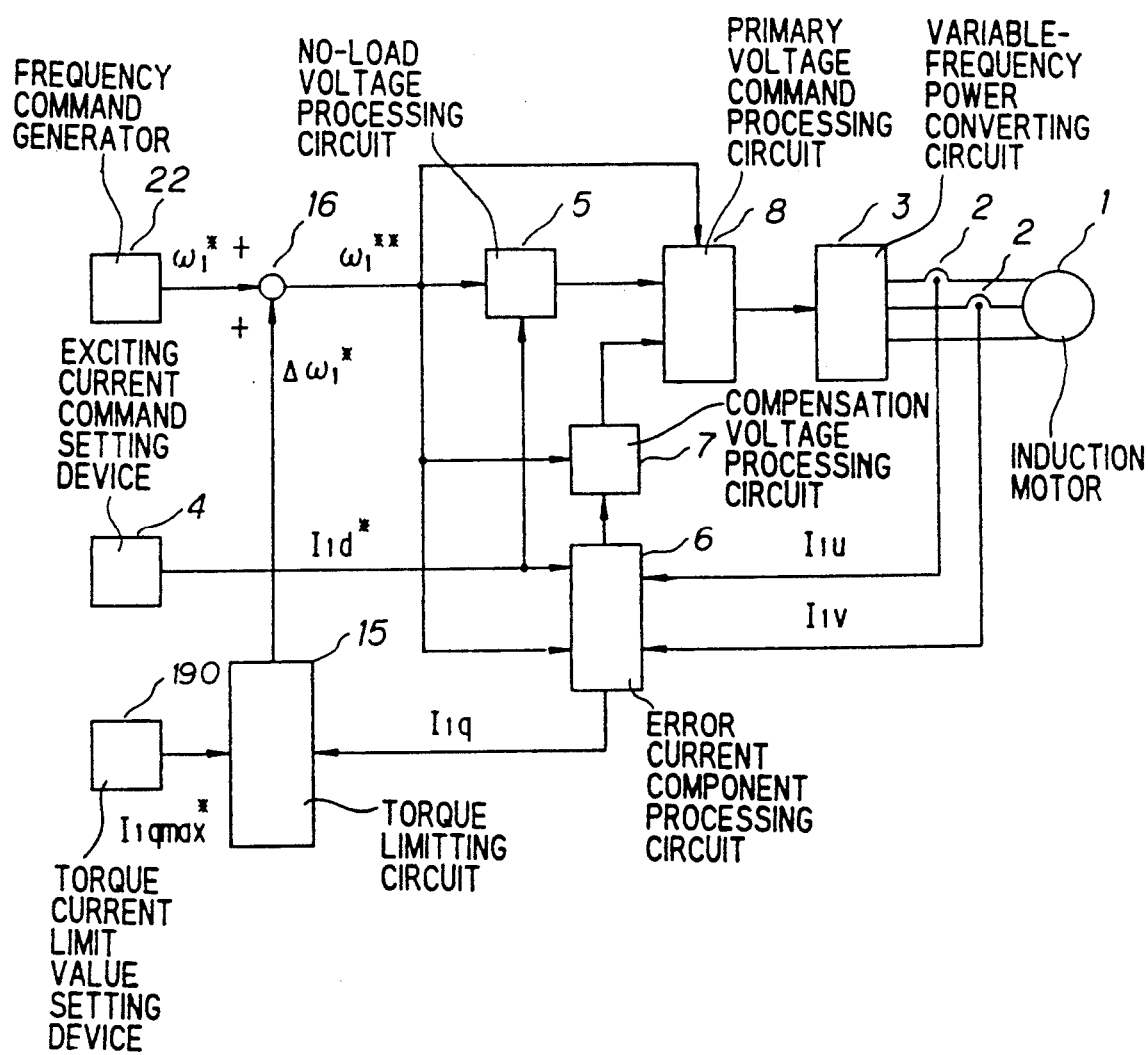
FIG. 15 is a block diagram showing a structure of a third embodiment of a controller for an induction motor of the present invention.

A third embodiment of the invention will be described in accordance with the drawings FIG. 15 is a block diagram showing a whole structure of a third embodiment of the invention, wherein numeral 2 denotes a current detector, numeral 3 denotes a variable-frequency power converting circuit, which comprises a transistor inverter circuit 21 and a PWM circuit 25, for example, in the conventional controller, numeral 4 denotes an exciting current command setting device, numeral 5 denotes a no-load voltage processing circuit, numeral 6 denotes an error current component processing circuit, numeral 7 denotes a compensation voltage processing circuit, numeral 8 denotes a primary voltage command processing circuit, numeral 190 denotes a torque current limit value setting device, numeral 15 denotes a torque limiting circuit, and numeral 16 denotes an adder. The structure of the frequency command generator 22 is the same as one in the conventional controller for an induction motor.

The input terminal 10 of the no-load voltage processing circuit 5 (shown in FIG. 5) in the third embodiment of the invention is connected to an adder 16, and the input terminal 33 of the error current component processing circuit 6 (shown in FIG. 6) is connected to the adder 16. Other parts of the structures of the no-load voltage processing circuit 5 and the error current component processing circuit 6 are the same as those in the second embodiment of the invention.

Figure 16:
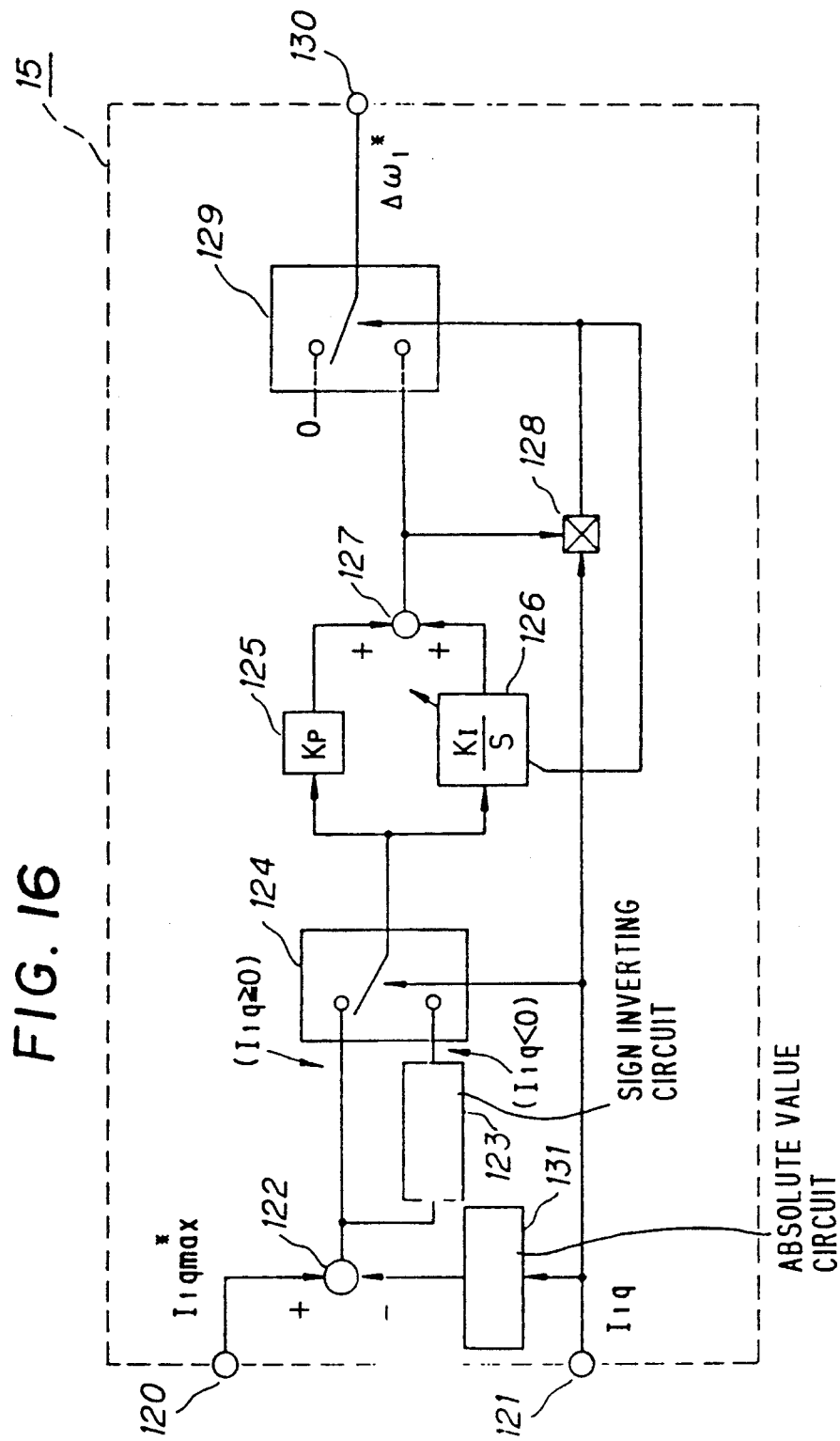
FIG. 16 is a block diagram showing an example of a structure of a torque limiting circuit shown in FIG. 15.

FIG. 16 is a block diagram showing n detail the structure of the torque limiting circuit 15, wherein the torque limiting circuit 15 comprises:

an input terminal 120 connected to the torque current limit value setting device 190,
an input terminal 121 connected to the error current component processing circuit 6,
an subtracter 122,
a sign reversing device 123,
signal discriminating devices 124 and 129,
a coefficient device 125,
a reset amplifying integral device 126,
an adder 127,
a multiplier 128,
an output terminal 130, and
an absolute value circuit 131.

The structure of the compensation voltage processing circuit 7 is the same as one shown in FIG. 7, which comprises:

input terminals 60, 61, and 63 connected to the error current component processing circuit 6,
an input terminal 62 connected to the adder 16,
coefficient devices 164, 68, and 171,
amplifiers 65 and 67,
adders 66, 70, and 72,
a multiplier 69, and
output terminals 73 and 74.

The input terminal 83 of the primary voltage command processing circuit 8 (shown in FIG. 8) in the third embodiment of the invention is connected to the adder 16. Other parts of the structure are the same as those in the second embodiment of the invention.

A control system of the induction motor in the third embodiment of the invention will be described as follows. The expressions (1)-(45) are the same as those described in the second embodiment of the invention. The term to make the right side of the expression (45) zero is added, since $I_{1d}$ and its command value $I_{1d}{}^*$ consist the expression (45) if the expression (43) consists, for ameliorating a damping character of the control system and for improving a stabilization ability. As a result, an expression (53) is inducted.

$$V_{1d} = R_1 I_{1d} + K_{cd} I_{err} \atop V_{1q} = R_1 I_{1q} + L_1 \omega_1 I_{1d}{}^* + (K_0 \omega_1 + K_{cq}) I_{err} \Bigg\} \quad (53)$$

$$K_0 = \frac{\sigma L_1}{1 - \sigma}, \; K_{cd} = K_0 K_d, \; K_{cq} = K_0 K_q$$

-continued $$I_{err} = I_{1d}{}^* - I_{1d} + \frac{\sigma I_{1q}^2}{I_{1d}{}^* - \sigma I_{1d}}$$

The generated torque $T_e$ in the induction motor is inducted from an expression (54), as commonly known.

$$\tau_e = \rho m (\Phi_{1d} I_{1q} - \Phi_{1q} I_{1d}) \quad (54)$$

$\tau m$:pole logarithm of induction motor

The expression (43) consists by controlling the induction motor by expression (53). Accordingly, an expression (55) is inducted by substituting the expression (43) for the expression (54).

$$\tau_a = \rho m L_1 I_{1d}{}^* I_{1q} \quad (55)$$

When the induction motor is controlled by the expression (53) in accordance with the expression (55), the generated torque $T_e$ is proportional with the torque value current $I_{1q}$. An expression (56) is inducted by transforming the expression (55).

$$I_{1q} = \frac{\tau_e}{L_1 I_{1d}{}^*} \quad (56)$$

The torque value current $I_{1q}$ necessary to generate a certain amount of torque $T_e$ in the induction motor is inducted in accordance with the expression (56). Accordingly, the control in accordance with the expression (53) is executed, the expression (43) consists, and the torque value current $I_{1q}$ is controlled to be the value inducted by the expression (56), for controlling the generated torque $T_e$ in the induction motor to comply with the command value $T_e{}^*$.

When the expression (43) consists by executing the control by the expression (53), the slide frequency $\omega_s$ of the induction motor is inducted by an expression (57) in a steady state by substituting the expression (43) for the expression (16).

$$\omega_s \frac{R_2 \cdot I_{1q}}{L_2 (I_{1d}{}^* - \sigma I_{1d})} \quad (57)$$

The relationship between the primary frequency $\omega_1$ and the slide frequency $\omega_s$ is shown by the expression (17). The slide frequency $\omega_s$, namely, the primary frequency $\omega_1$ is increased in order to increase the torque value current $I_{1q}$. In contrast, the slide frequency $\omega_s$, namely, the primary frequency $\omega_1$ is decreased in order to decrease the torque value current $I_{1q}$.

In the control system in the third embodiment of the invention as above, a proper control of the induction motor can be carried out, since the primary flux $\Phi_1$ is controlled constantly in accordance with the set value. The excess current can be inhibited by controlling the generated torque in the induction motor. Further, the generated torque in the induction motor can be controlled to comply with the command value.

An operation of the third embodiment of the invention will be described with reference to FIGS. 5, 6, 7, 8, 15, and 16. As shown in FIG. 15, the primary frequency compensation value $\Delta\omega_1{}^*$ outputted from the torque limiting circuit 15 is added to the primary frequency command value $\omega_1{}^*$ outputted from the frequency command generator 22 in the adder 16, which becomes a compensation primary frequency command value $\omega_1{}^{**}$.

A torque current limit value $I_{1qmax}^*$ inducted by the expression (56) is outputted from the torque current limit value setting device 190.

As shown in FIG. 5, a no-load voltage command $V_{1q0}^*$ is outputted by the multiplier 13. Namely, after the exciting current command $I_{1d}^*$ outputted from the exciting current command setting device 4 through the input terminal 11 is inputted in the coefficient device 12, a no-load voltage command $V_{1q0}^*$ ($=L_1\omega_1^{**} I_{1d}^*$) corresponding to the second term in the right side in the expression of $V_{1q}$ in the expression (49) is induced by multiplying the output from the coefficient device 12 and the compensation primary frequency command $\omega_1^{**}$ inputted from the adder 16 through the input terminal 10 by the multiplier 13, which is outputted from the output terminal 14.

As shown in FIG. 6, the error current component $I_{err}$, the d-axis component $I_{1d}$, and the q-axis component $I_{1q}$ of the primary current are outputted from the error current component processing circuit 6. Namely, the primary current $I_{1u}$ and $I_{1v}$ in the induction motor 1 detected by the current detector 2 are respectively inputted to the input terminals 31 and 32, and the expression (9) is operated by the coefficient devices 34-36 and the adder 37, as a result, the $\alpha$-axis component $I_{1\alpha}$ and the $\beta$-axis component $I_{1\beta}$ of the primary current are respectively outputted from the coefficient device 34 and the adder 37. On one hand, the compensation primary frequency command $\omega_1^{}$ in an analog amount outputted from the adder 16 is inputted to the V/F converter 38 through the input terminal 33, a pulse train signal frequency of which is proportional to the compensation primary frequency command $\omega_1^{}$ is generated, and an angle command $\theta_1^*$ in a digital amount which is a time integral value of the compensation primary frequency command $\omega_1^{**}$ is inducted by the counter 39 and is inputted as an address of the ROM 40 in which values of $\sin\theta_1^*$ and $\cos\theta_1^*$ are memorized. As a result, a digital amount of $\sin\theta_1^*$ and $\cos\theta_1^*$ is outputted from the ROM 40. The $\alpha$-axis component $I_{1\alpha}$ and the $\beta$-axis component $I_{1\beta}$ of the primary current outputted from the coefficient device 34 and the adder 37, and the digital amount of $\sin\theta_1^*$ and $\cos\theta_1^*$ outputted from the ROM 40 are inputted to the multiplying D/A converters 41-44, and are multiplied and converted to an analog data. The expression (50) which is an inverse operating expression of the expression (13) is operated by inputting the analog data to the adder 45 and the subtracter 46, and the d-axis component $I_{1d}$ and the q-axis component $I_{1q}$ of the primary current are inducted.

The expression (53) is operated by the coefficient devices 47 and 50, the multiplier 49, the divider 51, the adder 52, and the subtracter 53 in accordance with $I_{1d}$ and $I_{1q}$, and the exciting current command $I_{1d}^*$ inputted from the exciting current command setting device 4 through the input terminal 30. The error current component $I_{err}$ outputted from the subtracter 53 is outputted from the output terminal 54. $I_{1d}$ and $I_{1q}$ outputted from the adder 45 and the subtracter 46 are respectively outputted from the output terminals 55 and 56.

As shown in FIG. 16, the primary frequency compensation value $\Delta\omega_1^*$ is outputted from the torque limiting circuit 15. Namely, the torque current limit value $I_{1qmax}^*$ is outputted from the torque current limit value setting device 190 through the input terminal 120. The q-axis component of the primary current, namely, the torque value current $I_{1q}$ is outputted from the error current component processing circuit 6 through the input terminal 121. As a result, an absolute value of the torque value current $I_{1q}$ is operated by the absolute value circuit 131, and subtracted from the torque current limit value $I_{1qmax}^*$ by the subtracter 122.

The signal discriminating device 124 inputs the output from the subtracter 122, the output from the subtracter 122 sign-reversed by the sign reversing device 123, and the torque value current $I_{1q}$, and outputs the output from the subtracter 122 when the torque value current $I_{1q}$ is plus or zero, or outputs the output from the subtracter 122 sign-reversed by the sign reversing device 123 when the torque value current $I_{1q}$ is minus. Thereafter, the output from the signal discriminating device 124 is inputted to the coefficient device 125 and reset amplifying integral device 126. The reset amplifying integral device 126 amplifies the output from the signal discriminating device 124 $K_1$ times and integrates it, and the output is added to the output from the coefficient device 125 by the adder 127.

The multiplier 128 multiplies the output from the adder 127 with the torque value current $I_{1q}$, and the multiplying value is outputted to the reset amplifying integral device 126, and the signal discriminating device 129. As a result, in the reset amplifying integral device 126, an integral amount stored in the integral device is reset to zero, when the output from the multiplier 128 is plus or zero. The signal discriminating device 129 inputs the output from the adder 127 and the output from the multiplier 128, and outputs the output from the adder 127 when the output from the multiplier 128 is plus or zero, or outputs zero when the output from the multiplier 128 is minus, which is outputted from the output terminal 130 as the primary frequency compensation value $\Delta\omega_{1q}^*$.

As shown in FIG. 7, the d-axis compensation voltage component $\Delta V_{1d}$ and the q-axis compensation voltage component $\Delta V_{1q}$ are outputted from the compensation voltage component processing circuit 7. Namely, the d-axis component $I_{1d}$ of the primary current, the error current component $I_{err}$, and the q-axis component $I_{1q}$ of the primary current are inputted from the error current component processing circuit 6 through the input terminals 60, 61, and 63 respectively. As a result, an operation of the right side of the expression of $V_{1d}$ in the expression (55) carried out by the coefficient device 164, the amplifier 65 and 67, which is outputted as the d-axis compensation voltage component $\Delta V_{1d}$ from the output terminal 73. On one hand, an operation of the third term of the right side of the expression of $V_{1q}$ in the expression (53) is carried out, in accordance with the error current component $I_{err}$ and the compensation primary frequency command $\omega_1^{**}$ inputted from the adder 16 through the input terminal 62, by the amplifier 67, the coefficient device 68, the multiplier 69, and the adder 70, and an operation of the first term of the right side of the expression $V_{1q}$ in the expression (53) by the coefficient device 171 is carried out. A voltage component excepting the no-load voltage, which is a voltage of the second term of the right side of the expression of $V_{1q}$ in the expression (53), is outputted from the output terminal 74 as the q-axis compensation voltage component $\Delta V_{1q}$ by adding the output from the adder 70 and the coefficient device 171 by the adder 72.

As shown in FIG. 8, the primary voltage commands $V_{1u}^*$, $V_{1v}^*$, and $V_{1w}^*$ are outputted from the primary voltage command processing circuit 8. Namely, the d-axis compensation voltage component $\Delta V_{1d}$ and the q-axis compensation voltage component $\Delta V_{1q}$ are respectively inputted from the compensation voltage component processing circuit 7 through the input terminals 80 and 81. As shown in the expression (53), $\Delta V_{1d}$ can be regarded as the d-axis component command $V_{1d}^*$ of the primary voltage, since the d-axis component $\Delta V_{1d}$ of the primary voltage is zero in a no-load state. On one hand, by the adder 84, the no-load voltage command $V_{1q0}^*$ inputted from the no-load voltage processing circuit 5 through the input terminal 82 is added to the q-axis compensation voltage component $\Delta V_{1q}$, and an operation of the right side of the expression of $V_{1q}$ in the expression (53) is carried out, which is outputted as the q-axis component command $V_{1q}^*$ of the primary voltage. The compensation primary frequency command $\omega_1^{**}$ is inputted from the adder 16 through the input terminal 83, and digital values of sin $\theta_1^*$ and cos $\theta_1^*$ are outputted from the ROM 87 by the same operation as one in the compensation current component processing circuit 6. The d-axis component command $V_{1d}^*$ of the primary voltage inputted through the input terminal 80, the q-axis component command $V_{1q}^*$ of the primary voltage outputted from the adder 84, and a digital amount of sin $\theta_1^*$ and cos $\theta_1^*$ outputted from the ROM 87 are inputted to the multiplying D/A converters 88–91, are multiplied and converted to an analog data, and thereafter, are inputted to the subtracter 92 and the adder 93. As the result, the expression (12) is operated and the α-axis component command $V_1\alpha^*$ and the β-axis component command $V_1\beta^*$ of the primary voltage are inducted. By the coefficient devices 94, 97–99, the subtracter 95, and the adder 96, the expression (8) is operated, and the primary voltage commands $V_{1u}^*$, $V_{1v}^*$, and $V_{1w}^*$ are respectively outputted from the output terminals 100–102. An actual value of the primary voltage to be impressed to the induction motor 1 is controlled to comply with the primary voltage command by the same operation as one in the conventional device by inputting the primary voltage commands $V_{1u}^*$, $V_{1v}^*$, and $V_{1w}^*$ to the variable-frequency power converting circuit 3.

In the above embodiment of the invention, in the torque limiting circuit, a difference between the torque current limit value $I_{1qmax}^*$ and the absolute value of the torque value current $I_{1q}$, or the value sign-reversed, is proportioned and integrated. However, the structure of the torque limiting circuit 15 is changed to the one shown in FIG. 17, wherein only the integration is executed.

Figure 17:
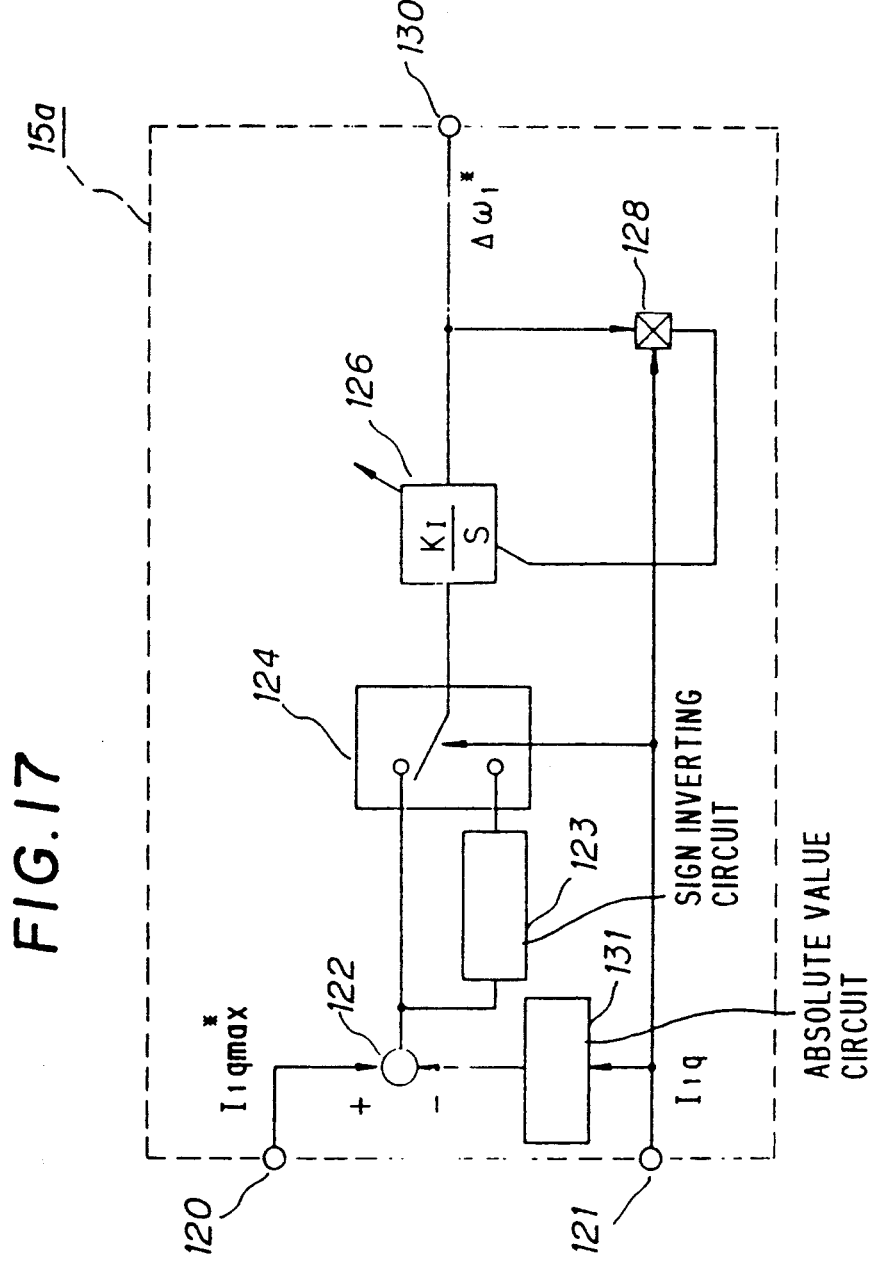
FIG. 17 is a block diagram showing another example of a structure of a torque limiting circuit shown in FIG. 15.

Namely, in the torque limiting circuit 15a shown in FIG. 17, the output from the signal discriminating device 124 is inputted to only the reset amplifying integral device 126. The output from the reset amplifying integral device 126 is outputted as the primary frequency compensation value $\Delta \omega_1^*$ from the output terminal 130.

In the above embodiment, in the torque limiting circuit 15, a difference between the torque current limit value $I_{1qmax}^*$ and the absolute value of the torque value current $I_{1q}$, or the value sign-reversed, is directly proportioned and integrated, or integrated. However, the structure of the torque limiting circuit 15 can be changing to one shown in FIG. 18, wherein the difference between the torque current limit value $I_{1qmax}^*$ and the absolute value of the torque value current $I_{1q}$, and the torque value current $I_{1q}$ are multiplied in the multiplier 133, and the output from the signal discriminating device 132 can be changed to 1 or −1 according to the polarity.

Figure 18:
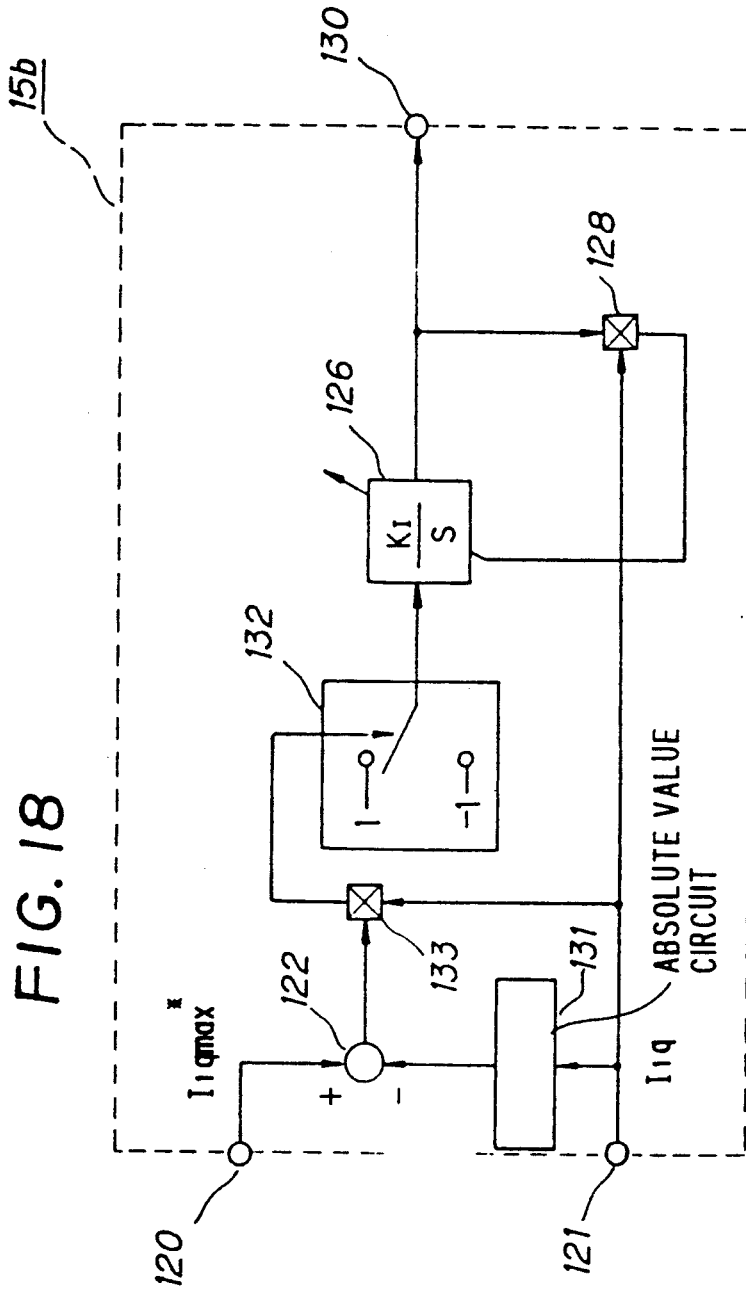
FIG. 18 is a block diagram showing a further example of a structure of a torque limiting circuit shown in FIG. 15.

Namely, in a torque limiting circuit 15b shown in FIG. 18, the absolute value of the torque value current $I_{1q}$ inputted from the input terminal 121 is subtracted in the subtracter 122 from the torque current limit value $I_{1qmax}^*$ inputted from the input terminal 120, by an arrange in the absolute circuit 131. The output from the subtracter 122 and the torque value current $I_{1q}$ are multiplied by the multiplier 133. The output from the multiplier 133 is inputted to the signal discriminating device 132. The signal discriminating device 132 outputs 1 when the output from the multiplier 133 is plus or zero, or outputs −1 when the output from the multiplier 133 is minus to the reset amplifying integral circuit 126.

The output from the reset amplifying integral circuit 126 is outputted as the primary frequency compensation value $\Delta \omega_1^*$ from an output terminal 130. Similarly to the above embodiment, the reset amplifying integral device 126 resets an integral amount stored in the integral device to zero, when the product of the primary frequency compensation value $\Delta \omega_1^*$ which is the output from the multiplier 128, namely the output from the reset amplifying integral circuit 126, and the torque value current $I_{1q}$ is plus or zero.

Figure 19:
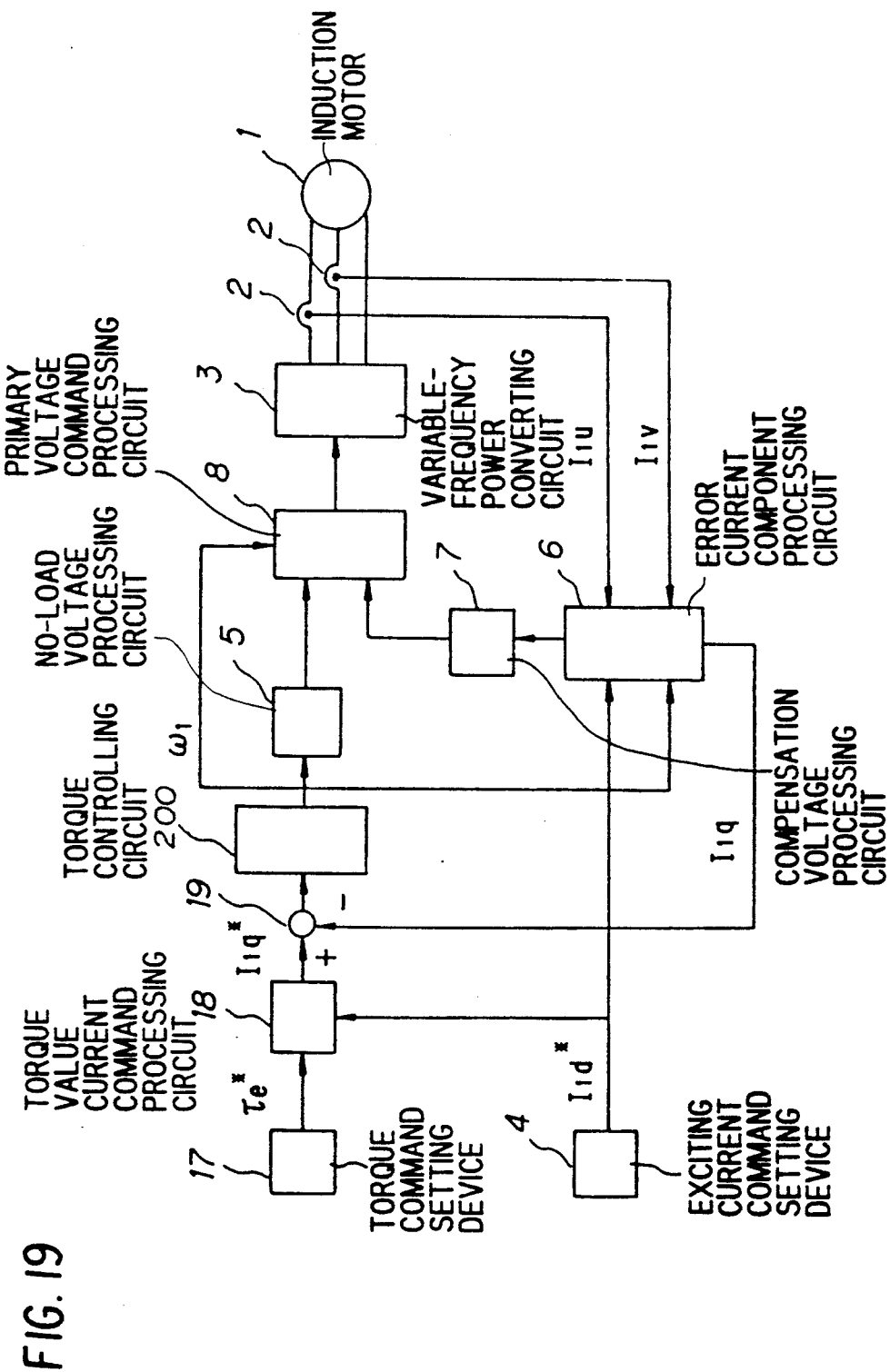
FIG. 19 is a block diagram showing a structure of a fourth embodiment of a controller for an induction motor of the present invention.

A fourth embodiment of the invention will be described with reference to the drawings. FIG. 19 is a block diagram showing a whole structure of the invention, wherein numeral 1 denotes a controller for an induction motor, numeral 2 denotes a current detector, numeral 3 denotes a variable-frequency power converting circuit, which comprises a transistor inverter circuit 21 and a PWM circuit 25, for example, in the conventional device, numeral 4 denotes an exciting current command setting device, numeral 5 denotes a no-load voltage processing circuit, numeral 6 denotes an error current component processing circuit, numeral 7 denotes a compensation voltage processing circuit, numeral 8 denotes a primary voltage command processing circuit, numeral 17 denotes a torque command setting device, numeral 18 denotes a torque value current command processing circuit, numeral 19 denotes a subtracter, and numeral 200 denotes a torque controlling circuit.

The circuits 1–8 have the same structure and carry out the same operation as those in the embodiment described above, and accordingly description thereof is herein omitted. In FIG. 5 showing in detail the structure of the no-load voltage processing circuit 5, the compensation primary frequency command $\omega_1^{**}$ is inputted from the input terminal 10, however, the primary frequency command $\omega_1^*$ is inputted in this embodiment. In FIG. 7 showing in detail the structure of the compensation voltage processing circuit 7, the compensation primary frequency command $\omega_1^{**}$ is inputted from the input terminal 62, however, the primary frequency command $\omega_1^*$ is inputted in this embodiment. In FIG. 8 showing in detail the structure of the primary voltage command processing circuit 8, the compensation primary frequency command $\omega_1^{**}$ is inputted from the input terminal 83, however, the primary frequency command $\omega_1^*$ is inputted in this embodiment.

Figure 20:
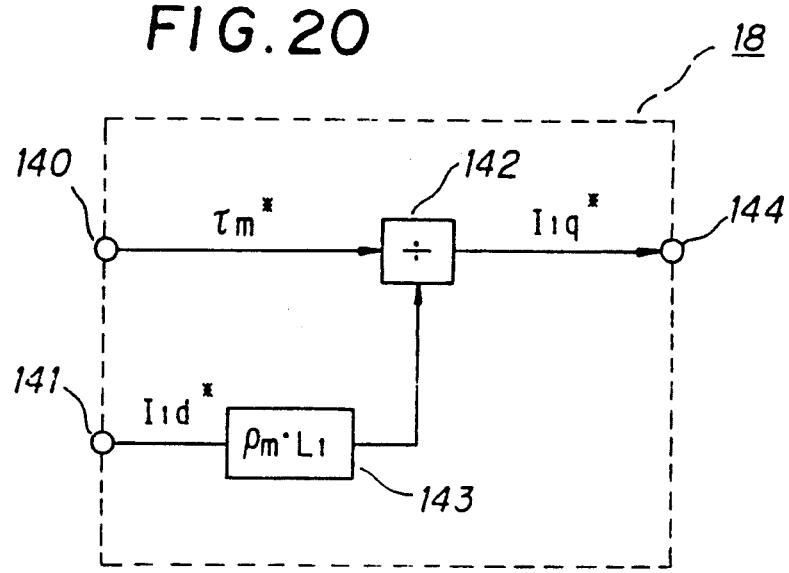
FIG. 20 is a block diagram showing an example of a structure of a torque value current command processing circuit shown in FIG. 19.

FIG. 20 is a block diagram showing in detail the structure of the torque value current command processing circuit 18, wherein the torque value current command processing circuit 18 comprises:

an input terminal 140 connected to a divider 142,
an input terminal 141 connected to a coefficient device 143, and
an output terminal 144.

Figure 21:
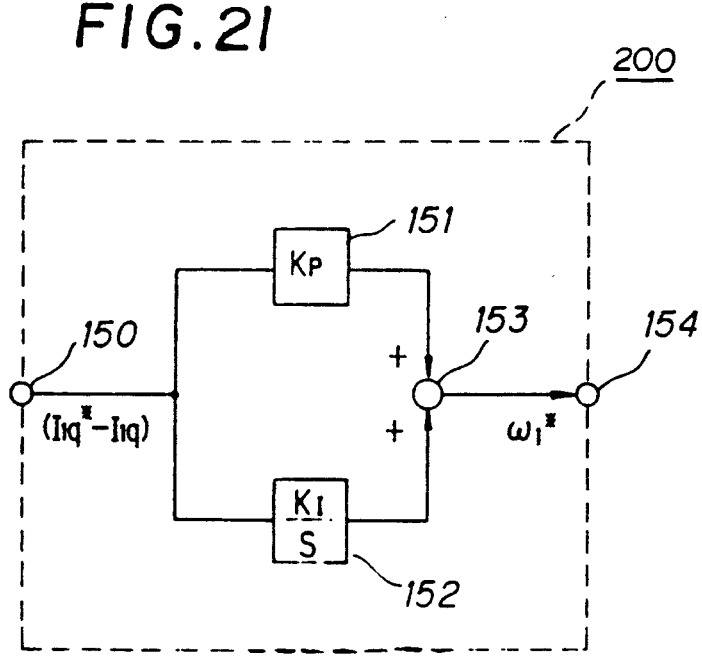
FIG. 21 is a block diagram showing an example of a structure of a torque controlling circuit shown in FIG. 19.

FIG. 21 is a block diagram showing in detail the structure of the torque controlling circuit 200, wherein the torque controlling circuit 200 comprises:
an input terminal 150 connected to a coefficient device 151 and an amplifying integral device 152, and an output terminal 154 connected to an adder 153.

An operation of the fourth embodiment of the invention will be described with reference to FIG. 19–FIG. 21. As shown in FIG. 20, a torque command $T_e^*$ outputted from the torque command setting device 17 through the input terminal 140 is inputted to the divider 142. The exciting current command $I_{1d}^*$ outputted from the exciting current command setting device 4 through the input terminal 141 is inputted to the coefficient device 143. The torque command $T_e^*$ is divided by the output from the coefficient device 143 by the divider 142, the result of which is outputted as a torque value current command $I_{1q}^*$ from the output terminal 144. Namely, the expression (56) is carried out in the torque value current command processing circuit 18.

As shown in FIG. 19, in the subtracter 19, the torque value current command $I_{1q}^*$ outputted from the torque value current command processing circuit 18 subtracts a q-axis component of the primary current outputted from the error current component processing circuit 6, namely, a torque value current $I_{1q}$, the result of which is outputted to the torque controlling circuit 200. As shown in FIG. 21, in the torque controlling circuit 200, a difference between the torque value current command $I_{1q}^*$ and the torque value current $I_{1q}$ is inputted from the input terminal 150, and is proportioned and integrated in the coefficient device 151 and the amplifying integral device 152. Further, the output from the coefficient device 151 and the output from the amplifying integral device 152 are added in the adder 153, which is outputted as the primary frequency command value $\omega_1^*$ from the output terminal 154.

In this embodiment, the difference between the torque value current command $I_{1q}^*$ and the torque value current $I_{1q}$ is directly proportioned and integrated in the torque controlling circuit 200. The structure of the torque controlling circuit 200 can be changed to one shown in FIG. 22, wherein the difference between the torque value current command $I_{1q}^*$ and the torque value current $I_{1q}$ is inputted to a signal discriminating device 156, and the output from the signal discriminating device 156 is switched to either 1 or $-1$ in accordance with the polarity.

Figure 22:
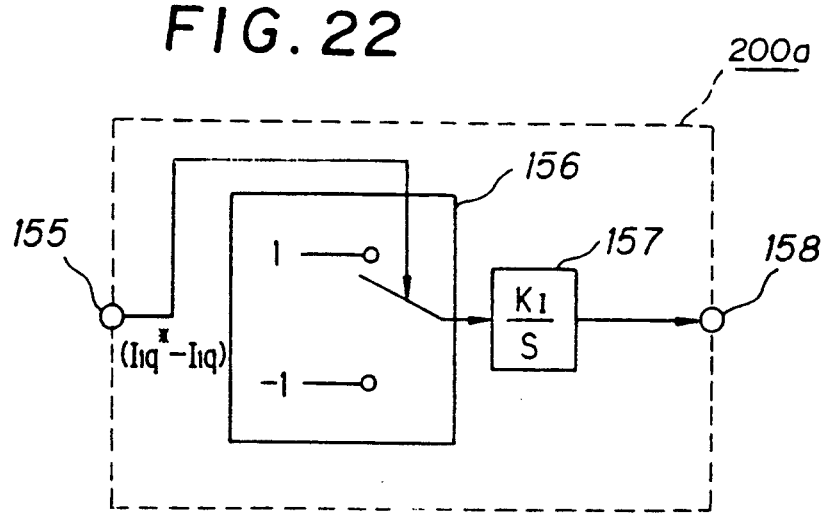
FIG. 22 is a block diagram showing another example of a structure of a torque controlling circuit shown in FIG. 19.

Namely, in a torque controlling circuit 200a shown in FIG. 22, the difference between the torque value current command $I_{1q}^*$ and the torque value current $I_{1q}$, inputted from an input terminal 155, is inputted to the signal discriminating device 156. The signal discriminating device 156 outputs 1 when the difference is plus or zero, or outputs $-1$ when the difference is minus, to an amplifying integral device 157. Thereafter, the output from the amplifying integral device 157 is outputted as the primary frequency command value $\omega_1^*$ from an output terminal 158.

In the above embodiment, the potential drop value by the primary resistance $R_1$ is compensated in the compensation voltage processing circuit by using the d-axis component $I_{1d}$ and the q-axis component $I_{1q}$ of the primary current. The structures of the compensation voltage processing circuit 7 and the primary voltage command processing circuit 8 can be changed to those shown in FIG. 9 and FIG. 14 respectively, wherein the potential drop value is compensated by using the primary current $I_{1u}$ and $I_{1v}$ detected by the current defector 2.

Namely, in the compensation voltage processing circuit 7a shown in FIG. 9, only the voltage component relating to the error current component $I_{err}$ in the expression (53) is operated, which is outputted as the d-axis compensation voltage component $\Delta V_{1d0}$ and the q-axis compensation voltage component $\Delta V_{1q0}$. Namely, $\Delta V_{1d0}$ and $\Delta V_{1q0}$ are inducted from the expression (51).

The compensation voltage components $\Delta V_{1d0}$ and $\Delta V_{1q0}$ are inputted to the primary voltage processing circuit 8a shown in FIG. 14 through the input terminals 80a and 81a. As a result, primary voltage commands $V_{1u0}^*$, $V_{1v0}^*$ and $V_{1w0}^*$ which neglect the potential drop value by the primary resistance $R_1$ are respectively outputted from the coefficient devices 97–99.

The primary current in the U-phase outputted from the current detector 2 through the input terminal 103 is inputted to the coefficient device 107, and the potential drop value $V_{RU}$ by the primary resistance $R_1$ in the U-phase is obtained, which is added to $V_{1u0}^*$ by the adder 110. As a result, the primary voltage command $V_{1u}^*$ in the U-phase including the potential drop value by the primary resistance $R_1$ is outputted from the output terminal 100.

Similarly, the primary voltage command $V_{1v}^*$ in the V-phase including the potential drop value by the primary resistance $R_1$ is inducted by the adder 111 by inputting the primary current in the V-phase outputted from the current detector 2 through the input terminal 104 to the coefficient device 108, and is outputted from the output terminal 101.

With respect to the W-phase, the primary current $I_{1w}$ in the W-phase is inducted from the primary current $I_{1u}$ and $I_{1v}$ by the adder 105 and the sign inverting device 106 by using the expression (52) which is commonly known. Similarly, $V_{WU}$ in the W-phase including the potential drop value by the primary resistance $R_1$ is obtained by the multiplier 109 and the adder 112, which is added to $V_{1w0}^*$ by the adder 112. As a result, the primary voltage command $V_{1w}^*$ in the W-phase including the potential drop; value by the primary resistance $R_1$ is inducted and outputted from the output terminal 102.

In another embodiment, the potential drop value by the primary resistance can be compensated in the primary voltage command processing circuit by using the $\alpha$-axis component $I_{1\alpha}$ and $\beta$-axis component $I_{1\beta}$ of the primary current. Further, the primary current $I_{1w}$ inducted by the operation by $I_{1u}$ and $I_{1v}$ can also be inducted by the value detected by the current detector.

As described above, according to the invention, the error current component, which becomes zero when the actual value of the primary flux occurring inside the induction motor coincides with the set value of the primary flux obtained from the product of the exciting current command value and the primary self-inductance in the induction motor, is operated from the primary current in the induction motor, and the primary voltage command value is compensated for the error current component approach to zero. As a result, the primary flux is controlled to coincide with the set value even in a low speed revolution, and the lack of torque or the excess current can be prevented.

Not only in the low speed revolution, but in any revolution speed, the primary flux in the induction motor is controlled to coincide with the set value. Accordingly, the rotation speed of the induction motor can be at controlled to be a stable state all the time, not depending upon the variation rate of the primary frequency command $\omega_1^*$.

A deviation of the actual value and the set value of the primary flux is operated as the current error. Accordingly, it is not necessary to detect the actual value of the primary flux directly, and the structure of the control circuit is simple, which makes implementation of the controller low in cost.

Further, the primary resistance set value is compensated to coincide with the actual value by using the error current component. Accordingly, a change of the primary resistance value due to a temperature change does not need to be observed by setting a detector, etc., and even though the primary resistance value in the induction motor changes, a state control can always be carried out at a low price.

Furthermore, according to the invention, the error current component, which becomes zero when the actual value of the primary flux occurring inside the induction motor coincides with the set value of the primary flux obtained from the product of the exciting current command value and the primary self-inductance in the induction motor, is operated from the primary current in the induction motor, and the primary voltage command value is compensated for the error current component approach to zero, and the primary frequency command is compensated for the generated torque in the induction motor not to be over the limit value. Accordingly, the primary flux is controlled to coincide with set value in any speed area, and the lack of the torque can be prevented. The rotation speed of the induction motor can be in controlled to be a stable state all the time, not depending upon the variation rate of the primary frequency command $\omega_1^*$, and the excess current can be prevented even in a sudden accelerated or decelerated operation.

Furthermore, according to the invention, the error current component, which becomes zero when the actual value of the primary flux occurring inside the induction motor coincides with the set value of the primary flux obtained from the product of the exciting current command value and the primary self-inductance in the induction motor, is operated from the primary current in the induction motor, and the primary voltage command value is compensated for the error current component to approach zero, and the primary frequency command is operated for the generated torque in the induction motor to comply with the command value. Accordingly, the generated torque in the induction motor can be controlled.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teachings herein set forth.

What is claimed is:

1. A controller for an induction motor, having a primary self-inductance value, responsive to a primary frequency command value and an exciting current command value, comprising:
    a current detecting means for detecting a primary current of said induction motor,
    a variable-frequency power converting means for driving said induction motor at a variable-frequency,
    a no-load voltage processing means for outputting a no-load voltage command value of said induction motor in response to said primary frequency command value and said exciting current command value,
    an error current processing means for processing an error current which becomes zero when an actual value of a primary flux occurring inside said induction motor, by inputting said primary current, said primary frequency command value, and said exciting current command value, coincides with a predetermined value of the primary flux obtained in response to said exciting current command value and a primary self-inductance of said induction motor,
    a compensation voltage processing means for processing a compensation voltage to direct said error current component value to zero by inputting said primary frequency command value and said output from said error current component processing means, and
    a primary voltage command processing means for processing a primary voltage command value of said induction motor by inputting said primary frequency command value, said no-load voltage command value, and said compensation voltage, and for outputting said primary voltage command value to said variable-frequency power converting means.

2. A controller for an induction motor comprising:
    a current detecting means for detecting a primary current of said induction motor,
    a variable-frequency power converting means for driving said induction motor at a variable-frequency,
    a no-load voltage processing means for outputting a no-load voltage command value of said induction motor by inputting a primary frequency command value and an exciting current command value,
    an error current component processing means for processing an error current component which becomes zero when an actual value of a primary flux occurring inside said induction motor, by inputting said primary current, said primary frequency command value, and said exciting current command value, coincides with a set value of said primary flux obtained from a product of said exciting current command value and a primary self-inductance of said induction motor,
    a primary resistance compensating means for generating a compensation quantity of a primary resistance set value in response to said output from said error current component processing means,
    a compensation voltage processing means having a primary resistance set value for processing a compensation voltage to direct said error current component value to zero by inputting said primary frequency command value, said output from said error current component processing means, and said output from said primary resistance compensating means, and
    a primary voltage command processing means for processing a primary voltage command value of said induction motor by inputting said primary frequency command value, said no-load voltage command value, and said compensation voltage, and for outputting said primary voltage command value to said variable-frequency power converting means.

3. A controller for an induction motor comprising:
a current detecting means for detecting a primary current of said induction motor,
a variable-frequency power converting means for driving said induction motor at a variable-frequency,
a no-load voltage processing means for outputting a no-load voltage command value of said induction motor by inputting a primary frequency command value, a primary frequency compensation value, and an exciting current command value,
an error current component processing means for processing an error current component which becomes zero when an orthogonal component on a rotating co-ordinate axis rotated by said primary frequency of said primary current and an actual value of a primary flux occurring inside said induction motor, by inputting said sum of said primary frequency command value and said frequency compensation value, said primary current, and said exciting current command value, coincide with a set value of a primary flux obtained from a product of said exciting current command value and a primary self-inductance in said induction motor,
a compensation voltage processing means for processing a compensation voltage to approach said error current component value to zero by inputting said sum of said primary frequency command value and said primary frequency compensation value, and said output from said error current component processing means,
a primary voltage command processing means for processing a primary voltage command value in said induction motor, by inputting said sum of said primary frequency command value and said primary frequency compensation value, and said no-load voltage command value and said compensation voltage, and for outputting said primary voltage command value to said variable-frequency power converting means, and
a torque limiting means for processing said primary frequency compensation value, in response to said output from said error current component processing means, so that said generated torque in said induction motor is not over a limit value.

4. A controller for an induction motor comprising:
a current detecting means for detecting a primary current of said induction motor,
a variable-frequency power converting means for driving said induction motor at a variable-frequency,
a no-load voltage processing means for outputting a no-load voltage command value of said induction motor by inputting a primary frequency command value and an exciting current command value,
an error current component processing means for processing an error current component which becomes zero when an orthogonal component on a rotating co-ordinate axis rotated by said primary frequency of said primary current and an actual value of a primary flux occurring inside said induction motor, by inputting said primary frequency command value, said primary current, and said exciting current command value, coincide with a set value of a primary flux obtained from a product of said exciting current command value and a primary self-inductance in said induction motor,
a compensation voltage processing means for processing a compensation voltage to direct said error current component value to zero by inputting said primary frequency command value and said output from said error current component processing means,
a primary voltage command processing means for processing a primary voltage command value of said induction motor by inputting said primary frequency command value, said no-load voltage command value, and said compensation voltage, and for outputting said primary voltage command value to said variable-frequency power converting means, and
a torque controlling means for processing said primary frequency command value in response to said output from said error current component processing means, so that said generated torque in said induction motor complies with said primary frequency command value.

5. A method of controlling an induction motor, having a primary self-inductance value responsive to a primary frequency command value and an exciting current command value, the method comprising the steps of:
detecting a primary current of said induction motor,
driving said induction motor at a variable frequency,
outputting a no-load voltage command value of said induction motor in response to said primary frequency command value and said exciting current command value;
processing an error current which becomes zero when an actual value of a primary flux occurring inside said induction motor coincides with a predetermined value of the primary flux obtained in response to said exciting current command value and a primary self-inductance of said induction motor,
processing a compensation voltage to direct said error current component value to zero by inputting said primary frequency command value and said output from said error current component processing means, and
processing a primary voltage command value of said induction motor by inputting said primary frequency command value, said no-load voltage command value, and said compensation voltage, and outputting said primary voltage command value.

6. The method of controlling an induction motor as recited in claim 5, the method further comprising the step of generating a compensation quantity of a primary resistance set value in response to said step of processing an error current component, wherein said step of processing a compensation voltage further comprises a step of inputting said compensation quantity thus generated in said generating step.

7. The method of controlling an induction motor as recited in claim 5, wherein said step of processing an error current component comprises the step of detecting an orthogonal component on a rotating coordinate axis rotated by said primary frequency of said primary current and an actual value of a primary flux occurring inside said induction motor, wherein said error current component becomes zero upon detection of said orthogonal component, and wherein the method further comprises the step of processing said primary frequency compensation value, in response to said error current component, so that the torque generated by said induction motor is not over a limit value.

8. The method of controlling an induction motor as recited in claim 5, wherein said step of processing an error current component further comprises a step of detecting an orthogonal component on a rotating coordinate axis rotated by said primary frequency of said primary current and an actual value of a primary flux occurring inside said induction motor, the method further comprising the step of processing said primary frequency command value in response to said error current component so that the torque generated by said induction motor complies with said primary frequency command value.

9. A controller for a motor responsive to a primary frequency command value and an exciting current command value, the controller comprising:

a detector, coupled to said motor, detecting a primary current applied to said motor;

a voltage command generator, receiving said primary frequency command value and said exciting current command value, producing a no-load voltage command value for controlling said induction motor;

an error current processor, coupled to said current defector, receiving said primary current, said primary frequency command value and said exciting current command value, processing an error current which becomes zero when an actual value of a primary flux occurring inside said induction motor coincides with a predetermined value of the primary flux obtained in response to said exciting current command value;

a compensation voltage processor, coupled to said error current processor, processing a compensation voltage to direct said error current component value to zero in response to said primary frequency command value and said error current component output by said error current processor; and a primary voltage command processor, coupled to said no-load voltage processor and said compensation voltage processor, processing a primary voltage command value of said induction motor in response to said primary frequency command value said no-load voltage command value, and said compensation voltage, and outputting said primary voltage command value to control said induction motor.

* * * * *